US011992833B2

(12) United States Patent
Sager et al.

(10) Patent No.: US 11,992,833 B2
(45) Date of Patent: May 28, 2024

(54) PIPETTE TIP EXTENSION FOR TREATING A SAMPLE WITH A LIQUID ATTACHABLE TO A PIPETTE TIP

(71) Applicant: TECAN TRADING AG, Mannedorf (CH)

(72) Inventors: Adrian Sager, Mannedorf (CH); Philipp Ott, Steg (CH); Patrick Kinney, Hayward, CA (US); Hagen Reinhardt, Bolligen (CH); Michael Keller, Bauma (CH); Sujata Iyer, San Jose, CA (US)

(73) Assignee: TECAN TRADING AG, Mannedorf (CH)

( * ) Notice: Subject to any disclaimer, the term of this patent is extended or adjusted under 35 U.S.C. 154(b) by 506 days.

(21) Appl. No.: 17/295,624

(22) PCT Filed: Dec. 20, 2019

(86) PCT No.: PCT/US2019/067755
§ 371 (c)(1),
(2) Date: May 20, 2021

(87) PCT Pub. No.: WO2020/132394
PCT Pub. Date: Jun. 25, 2020

(65) Prior Publication Data
US 2022/0023854 A1 Jan. 27, 2022

(30) Foreign Application Priority Data

Dec. 20, 2018 (WO) ................ PCT/US2018/066850
Dec. 20, 2018 (WO) ................ PCT/US2018/066857

(51) Int. Cl.
*G01N 35/10* (2006.01)
*B01L 3/00* (2006.01)
(Continued)

(52) U.S. Cl.
CPC .......... *B01L 3/0275* (2013.01); *B01L 3/0279* (2013.01); *B03C 1/01* (2013.01); *B03C 1/32* (2013.01);
(Continued)

(58) Field of Classification Search
CPC ..... B01L 3/02; B01L 7/00; B03C 1/01; B03C 1/32; G05D 3/00; B01J 19/00; G01N 35/00; G01N 35/04; G01N 35/10
See application file for complete search history.

(56) References Cited

U.S. PATENT DOCUMENTS 7,641,859 B2 * 1/2010 Cote .................. B01L 3/0279
422/522
2014/0056781 A1 * 2/2014 Jaaskelainen ......... B01L 3/0217
422/501
(Continued)

FOREIGN PATENT DOCUMENTS

DE 19742163 A1 4/1999
WO 2018026886 A1 2/2018

OTHER PUBLICATIONS

International Search Report and Written Opinion for corresponding PCT application No. PCT/US2019/067755, mailed Apr. 20, 2020.

*Primary Examiner* — Brandi N Hopkins
(74) *Attorney, Agent, or Firm* — Notaro, Michalos & Zaccaria P.C.

(57) ABSTRACT

A pipette tip extension attachable to a pipette tip having a proximal end, a distal end, and an exterior wall extending between the proximal end and the distal end is disclosed. The exterior wall has an outer side and an inner side and forms at the proximal end a reception aperture for inserting a pipette tip, and at the distal end a dispense aperture. The
(Continued)

pipette tip extension further has an inner cavity, a distance element connected to the inner side of the exterior wall, and a constriction element.

22 Claims, 10 Drawing Sheets

(51) Int. Cl.
  *B01L 3/02* (2006.01)
  *B03C 1/01* (2006.01)
  *B03C 1/32* (2006.01)
(52) U.S. Cl.
  CPC ............ *G01N 35/10* (2013.01); *B01L 3/0217* (2013.01); *B01L 2200/023* (2013.01); *B01L 2200/025* (2013.01); *B01L 2200/026* (2013.01); *B01L 2300/0832* (2013.01); *B01L 2300/0858* (2013.01); *B01L 2300/18* (2013.01); *B01L 2400/0478* (2013.01); *G01N 2035/103* (2013.01)

(56) References Cited

U.S. PATENT DOCUMENTS

| | | |
|---|---|---|
| 2015/0125942 A1 | 5/2015 | Grier, Jr. |
| 2015/0266026 A1 | 9/2015 | Katsumoto |

* cited by examiner

A-A

A-A

B-B

PIPETTE TIP EXTENSION FOR TREATING A SAMPLE WITH A LIQUID ATTACHABLE TO A PIPETTE TIP

The current invention relates to a pipette tip extension for interacting with areas of interest of biological samples. The pipette tip extension is attachable to a pipette tip. The invention further relates to an assembly of a pipette tip extension and a pipette tip, and to a method of using a pipette tip extension. The present invention claims priority of the international patent application No. PCT/US18/66850, and of the international patent application No. PCT/US18/66857, both having been filed on Dec. 20, 2018.

TECHNICAL FIELD OF THE INVENTION

Description of the Related Art

In order to provide a histopathological diagnosis, excised tissue is viewed under the microscope. With the advent of personalized medicine and the development of molecular techniques, these tissue sections may be further studied for the purpose of making therapeutic decisions and in some cases, specific areas of the tissue (so called AOI—area of interest) may be demarcated for analysis. For example, in the analysis of tumor samples with the aim to decide which drug or drug combination is best-suited in cancer therapy, there may be the need to isolate tumor cells from a mixture of tumor and normal cells and subsequently extract and purify nucleic acids, proteins or other subcellular elements and molecules from sections of frozen and formalin fixed paraffin embedded (FFPE) tumor tissue. Currently, tissue sections are collected by mechanically scraping the area of interest from the surface of a tissue slide or tissue block, or alternatively isolated from tissue sections using laser capture microdissection (LCM) and related techniques. The tissue sections will then undergo further steps—such as deparaffinization, cell lysis and a purification—using physical, chemical and biochemical methods. For smaller AOI's, mechanical scraping using for example a sharp knife has typically a low spatial precision and in addition is susceptible to contamination of cells or molecules of the surrounding areas. LCM is useful for smaller regions but is expensive and non-conducive to clinical workflows. Larger AOI's may be addressed by mechanical scraping, which however is not integratable into an automated processing.

SUMMARY OF THE INVENTION

It is an object of the present invention to provide an alternative device and an alternative method to specifically address and treat a locally restricted area of interest of a sample, in particular a biological sample, provided on a surface This problem is solved by a pipette tip extension which is attachable to a pipette tip, and which pipette tip extension has the features of claim 1. Further embodiments of the pipette tip extension as well as an assembly comprising a pipette tip extension and a pipette tip, and a method of using the pipette tip extension for treating a sample are defined by the features of further claims.

A pipette tip extension according to the invention is attachable to a pipette tip and comprises a proximal end, a distal end, and an exterior wall extending between the proximal end and the distal end. The exterior wall has an outer side and an inner side and forms at the proximal end a reception aperture for inserting a pipette tip. The exterior wall forms at the distal end a dispense aperture. The pipette tip extension comprises an inner cavity enclosed by the inner side of the exterior wall, and a distance element connected to the inner side of the exterior wall. The distance element is configured to position a pipette tip within the inner cavity and to establish a fluid uptake area adjacent to the inner side of the exterior wall. The fluid uptake area extends from the dispense aperture towards the reception aperture and is in fluid connection with the surrounding atmosphere at the reception aperture. The pipette tip extension further comprises a constriction element which is connected to the inner side of the exterior wall of the pipette tip extension. The constriction element is configured to control an insertion depth of a pipette tip within the pipette tip extension and thereby to define a gap with a gap height between a distal end of an inserted pipette tip and the distal end of the pipette tip extension. The constriction element defines an end stop for a pipette tip and is configured as a fluid-permeable sieve-like structure.

The proximal end refers in connection with the pipette tip extension to the end of the pipette tip extension which is closest to a reception aperture into which a pipette tip may be inserted. Occasionally, the proximal end might also be addressed to as the upper end of the pipette tip extension. Accordingly, the distal end refers in connection with the pipette tip extension to the end of the pipette tip extension being more distant to the reception aperture for inserting a pipette tip. Thus, the distal end is opposite to the reception aperture, and might also be addressed to as a lower end or bottom end. In connection with a pipette tip, the term proximal end refers to the upper end of the pipette tip which is for use typically attached to a pipette and the associated pipetting channel, while the term distal end refers to the lower end of the pipette tip with an outlet opening for aspirating or dispensing a liquid.

The term "a pipette tip extension attachable/attached to a pipette tip" describes essentially the same situation as the term "a pipette tip insertable/inserted into the pipette tip extension 1". It is described here that the pipette tip extension is configured to be connectable to a pipette tip. This may be realized in that, in particular, the diameter of reception aperture and the dimension of the inner cavity formed by the exterior wall is adapted to the dimensions of a pipette tip which shall be inserted into the pipette tip extension. The dimensions of the reception aperture and the inner cavity allow the uptake of a specific pipette tip, and ensures according to the invention that a gap is formed between the outer wall of the inner pipette tip and the inner wall of the pipette tip extension, into which gap a fluid or liquid can be moved.

A suitable pipette tip may for example be a disposable pipette tip made of a plastic material, or of a so-called fixed pipette tip, made of a metal.

In the context of the present invention, a disposable pipette tip is a pipette tip which may be taken up and/or ejected for example by a liquid handling device automatically. It may be made of a plastic material, and the connection to the liquid handling device may be realized by slightly deforming the plastic to achieve a friction fit connection between the tip and the device.

In the context of the present invention, a fixed pipette tip may be connected to the liquid handling device mechanically by form fit, for example may be screwed to the device. Mounting and dismounting typically requires a manual interaction. A fixed pipette tip may be made of a metal to ensure a stable shape.

The distance element is configured to position an inserted pipette tip at a defined distance to the inner wall of the pipette tip extension, and thereby allows the formation of a fluid uptake area at the inner side of the exterior wall of the pipette tip extension also when a pipette tip is inserted. A distance element thus prevents that an inserted pipette tip fully abuts the inner side of the exterior wall of the pipette tip extension. The distance element therefore function as spacer which allows the fluid uptake area being further limited by a pipette tip when such a pipette tip is inserted into the pipette tip extension.

One distance element is sufficient to space an inserted pipette tip apart from the inner side of the exterior wall for forming a channel between the outer side of the inserted pipette tip and the inner side of the pipette tip extension. This channel may take up a fluid which is to be moved between the pipette tip and the pipette tip extension. A distance element according to the invention may provide a seat for a pipette tip in which the pipette tip does not contact the inner side of the exterior wall.

The distance element is in addition configured to provide a connection with an inserted pipette tip which allows the pipette tip extension being moved by moving the inserted pipette tip, for example under the control of a liquid handling workstation 29. The connection may for example be a friction fit connection between the pipette tip extension and an inserted pipette tip, though a form-fit connection may also be possible.

Neither when using one nor when using more distance elements, a distance element does not extend circumferentially along the inner side of the exterior wall, so that the pipette tip extension or the fluid uptake area, respectively, is never closed towards the reception aperture. The reception aperture at the proximal end of the pipette tip extension is during use at least partially open and thus not completely closed, e.g. by a cover, a seal, the pipette tip it is attached to, or a combination thereof. By remaining open to the surrounding atmosphere, sufficient pressure equalization is ensured when a liquid is dispensed from a pipette tip into the fluid uptake area of an attached pipette tip extension.

The distance elements subdivide the inner cavity into a fluid uptake area and a pipette tip hosting area, which correspond to the later position of an inserted pipette tip. The configuration of the distance element and the number used may define the volume of liquid which may be taken up in the fluid uptake area. The fluid uptake area may for example be restricted by the outer wall of an inserted pipette tip and the inner wall of the pipette tip extension, though when the pipette tip extension is configured for treating larger area of interest, additional structures may be used for further restricting the fluid uptake area, as discussed later. Depending on such additional structures, the fluid uptake area may for example extend up to the reception aperture, or may extend simply towards the reception aperture.

In the context of the present invention, a fluid may be any type of liquid or gas, for example a liquid sample, a reagent, a buffer, etc. The fluid may also be a mixture of different liquids (e.g. an emulsion), a mixture of different gases, a mixture of a liquid and a gas (i.e. an aerosol), or a mixture of a liquid and a solid dispensed in said liquid (i.e. a suspension). Solid particles may for example be abrasive particles such a sand, or may be magnetic beats. The liquid may also be a solvent for molecules of interest.

The pipette tip extension is attached to a pipette tip in such a manner that the distal end of both the pipette tip extension and the pipette tip point in the essentially same direction. The same applies to the proximal ends of the pipette tip extension and the pipette tip.

The constriction element functions as a stopper element which is able to restrict the insertion depth of a pipette tip when the pipette tip extension is attached to said pipette tip. The constriction element shall in particular prevent that the distal end of a pipette tip, which is inserted, is positioned flush with the distal end of the pipette tip extension or even protrudes from of the dispense aperture of the pipette tip extension.

By restricting the insertion of a pipette tip to a defined depth within the inner cavity of the pipette tip extension according to the invention, a gap, or a corresponding gap height, is defined which is generated when a pipette tip is inserted until the insertion is stopped at the constriction element.

In addition to the stop function, the constriction element is further configured to allow a fluid passing the constriction element when the fluid shall be moved between an inserted pipette tip and the fluid uptake area of the pipette tip extension. This fluid-permeability is achieved be the sieve-like structure of the constriction element. A sieve-like structure in the context of the present invention is understood as a structure having passages for a fluid, while holding back an inserted pipette tip. The sieve-like structure may allow in particular a fluid passaging between an inserted pipette tip and the gap of the pipette tip extension and may further allow a fluid passaging between the gap and the uptake area of the pipette tip extension. The fluid passage may be provided for example by pores or through holes or openings in a structure being otherwise able to hold back an inserted pipette tip from being further introduced into the pipette tip extension. Such a structure may for example be coarse or fine, and for example be a braid, a grid, or a perforated plate.

In the context of the present invention, the distance elements may function here for positioning an inserted pipette within the inner cavity and in relation to the inner side of the exterior wall, thereby allowing that the fluid uptake area is formed without restricting a fluid passage between an inserted pipette tip and the gap. The distance element may additionally serve to hold the position of an inserted pipette tip with respect to the inner side of the exterior wall to a certain extend by providing a certain lateral stability, without hindering a fluid being moved out of an inserted pipette tip towards the gap. The constriction element then may in addition ensure that an inserted pipette tip is hold at a defined height within the cavity and thereby ensuring that a gap is formed which further serves as a fluid passage. The constriction element may be an additional safeguard to ensure a repeatable gap height. The sieve-like structure may then allow a liquid being moved between an inserted pipette tip, the gap, and the fluid uptake area.

The gap height, which is e.g. generated when a pipette tip is inserted under a controlled manner with the aid of the constriction element, may for example be 0.1 mm to 1 mm.

In the context of the present invention, the gap describes the space between the distal end of the pipette tip extension and the distal end of a pipette tip, which is generated when the pipette tip extension and the pipette tip are assembled. The gap serves as a fluid connection between the inner cavity of the pipette tip and the fluid uptake area of the pipette tip extension and is also a part of the fluid uptake area. Upon placing the distal end of the pipette tip extension onto a surface, such as a surface of a microscope slide with a tissue section, the gap may be restricted towards the distal end of the pipette tip extension by closing the dispense aperture of the extension with said surface. Is the dispense aperture of the pipette tip extension closed, a fluid flow between the inner cavities of the pipette tip and the pipette tip extension is possible. Depending on the inner geometry at the distal end of the pipette tip, the volume of liquid and the flow rate can be influenced. A higher flow rate would in particular maximize the shear stress of the liquid on the tissue, while the flow must be sufficient to ensure that the liquid may contact the complete area on the surface of the addressed tissue covered by the dispense aperture of the pipette tip extension.

The use of a constriction element has the advantage that the insertion depth of a pipette tip within the pipette tip extension is controllable by a physical structure, which may be provided in the pipette tip extension. The constriction element according to the invention defines an end stop end for a pipette tip. The end stop provides the stopper function, in that it is for example abuttable by the distal end of a pipette tip when it is inserted into the pipette tip extension.

The control of the insertion depth may ensure that the pipette tip leaves a gap below its distal end when positioned within the pipette tip extension. The gap allows, when the dispense aperture of the pipette tip extension is closed e.g. by a prepared sample or by a part of the surface the sample is provided on, that the liquid may be transported from the pipette tip over the gap and the sample into the fluid uptake area of the pipette tip extension. The gap functions as a fluid connection between the inner cavity of the pipette tip and the fluid uptake area of the pipette tip extension. In an advantageous embodiment, the distance element(s) is or are arranged in such a manner that a continuous fluid uptake area is generated along the inner side of the pipette tip extension, which means that preferably no isolated channels are generated but that each generated fluid uptake area is in fluid connection with the other fluid uptake areas. This ensures that the liquid which is moved between the pipette tip and the pipette tip extension and over the sample remains homogeneously.

In an embodiment of the invention, which may be combined with any other of the embodiments which were or will be mentioned, unless there is a contradiction, the distance element is a sleeve which is configured to receive and circumferentially enclose a distal end of a pipette tip within the inner cavity, without restricting a fluid passage between an inserted pipette tip and the gap.

In this embodiment, the shape and dimension of the sleeve may be adapted to the shape and dimensions of a distal end of a pipette tip which shall be inserted into the sleeve. For example, the sleeve may taper from a proximal to distal direction when the distal end of a pipette tip does so. A sleeve in the context of the present invention is a tubular, elongated envelope or circumferential wall into which at least a distal end of a pipette tip may be inserted. The inner side of the sleeve is thereby contacted by the outer side of the pipette tip. When a pipette tip is inserted into the sleeve, the pipette tip is aligned within the inner cavity of the pipette tip extension. The position and alignment of the pipette tip within the inner cavity of the pipette tip extension may be influenced by the configuration of the shape and dimension of the sleeve as well as by the position of the sleeve within the inner cavity of the pipette tip extension.

In an embodiment of the invention, which may be combined with any other of the embodiments which were or will be mentioned, unless there is a contradiction, the sleeve is open at the distal end for allowing a liquid being dispensed from an inserted pipette tip into the gap.

The configuration of the sleeve may have an influence onto the configuration of the constriction element. For example, it is possible that the sleeve is configured to have the distal end of the sleeve being flush with the distal end of a pipette tip which is inserted into the sleeve. In this case it may be an advantage to arrange the constriction element in an immediate operative connection to the distal end of the sleeve, so that the stop function of the end stop may exercise for example its function upon the distal end of the pipette tip.

It may also be possible that the sleeve is configured to have the distal end of the sleeve being offset from the distal end of a pipette tip which is inserted into the sleeve, the offset being along the medial axis of the pipette tip extension. If for example the distal end of the pipette tip projects out of the distal end of the sleeve, the constriction element may be spaced apart from the distal end of the sleeve, though for example in functional connection with the distal end of the pipette tip. If for example the distal end of the pipette tip is positioned within the sleeve, the constriction element may for example be configured to protrude inwardly into the sleeve.

In an embodiment of the invention, which may be combined with any other of the embodiments which were or will be mentioned, unless there is a contradiction, the sleeve is connected to the inner side of the exterior wall by one or more distance bars which are arranged at the inner side of the pipette tip extension.

By use of such distance bars, for example the position of the sleeve within the inner cavity may be controlled. By use of bar like elements, it may for example also be ensured that the fluid uptake area is in fluid connection with the surrounding atmosphere at the reception aperture.

In an embodiment of the invention, which may be combined with any other of the embodiments which were or will be mentioned, unless there is a contradiction, the pipette tip extension comprises at least two, preferably at least three additional distance elements, each distance element being configured as a distance bar which extends along a direction from the proximal end towards the distal end of the pipette tip extension, wherein the form of the distance bars and the position of the distance bars are configured such that each distance bar can be abutted by an outer side of a pipette tip when inserted into the pipette tip extension.

In this configuration, the additional distance elements may supplement the function of the sleeve of position a pipette tip. Such additional distance elements may have a configuration in which they protrude into the inner cavity. They may here have a surface which is directed towards a medial axis of the pipette tip extension, which can be abutted by an outer side of a pipette tip when the pipette tip extension is attached to the pipette tip. This configuration may be particularly useful if the pipette tip extension is an elongated body (elongated along the medial axis), with a respective elongated inner cavity. In such an elongated embodiment, the additional distance elements may provide a further stability, as an inserted pipette tip is not only positioned by the sleeve but in addition in a more proximal region by such additional distance bars.

An additional distance element may for example be an inner bar, but also other types of protrusions at the inner side of the exterior wall of the pipette tip extension are possible, such as noses, as well as varying forms such as straight or snake- or wave-like bars. Combinations of protrusions of different types or forms are possible. Irregular forms are particularly suitable for providing an additional mixing effect to the liquid which is introduced into the pipette tip extension. It might be possible that only one additional distance element is provided at the inner side of the exterior wall, as long as it still allows the formation of a fluid uptake area in the inner cavity of the pipette tip extension. By coordinating the depth of each additional distance element it may for example be possible to influence the position of an inserted pipette tip within a pipette tip extension in particular in the proximal region of the pipette tip extension, for example in a centric or acentric manner.

In an embodiment of the invention, which may be combined with any other of the embodiments which were or will be mentioned, unless there is a contradiction, the sleeve is arranged centrally within the inner cavity, extending along a medial axis of the pipette tip extension.

A central position may be desired for stability reasons, or so simplify for example the manufacturing process. A central position may be achieved by using additional distance bars for connecting and positioning the sleeve within the desired position in the inner cavity of the pipette tip extension.

It is alternatively possible for example, if the sleeve shall not be connected to the exterior wall by additional distance elements, to connect the sleeve itself to the inner side of the exterior wall. In this situation, also the distal end of the pipette tip would be positioned acentrally within the inner cavity of the pipette tip extension.

In an embodiment of the invention, which may be combined with any other of the embodiments which were or will be mentioned, unless there is a contradiction, the sleeve is adapted to the shape of a distal end of a pipette tip.

The adaptation of the sleeve shape, in particular of the inner sleeve shape, to the shape of the distal end of a pipette tip which shall be inserted may provide an increase in the position precision and the stability of the inserted pipette tip within the pipette tip extension.

In an embodiment of the invention, which may be combined with any other of the embodiments which were or will be mentioned, unless there is a contradiction, the constriction element comprises a guiding plate which defines or is connected to the end stop, the guiding plate being arranged close to the distal end of the pipette tip extension but offset from the distal end of the pipette tip extension towards the proximal end, and delimits together with the inner side of the exterior wall the gap at the distal end of the pipette tip extension.

In this embodiment, the length of the offset (along the medial axis) determines the gap height. The guiding plate may be arranged between the distance element, in particular when it is configured as a sleeve, and the distal end of the pipette tip extension, with an offset to the distal end of the pipette tip extension. The guiding plate may guide a liquid which is dispensed by pipette tip through the gap and into the fluid uptake area. The guiding plate may for this have a planar extension, having a disc-like shape, for example, for guiding a liquid. Thus, the surface size of a guiding plate which faces to the gap may be adapted to the lateral extension of the gap, while leaving a fluid passage for example at the outer rim of the guiding plate which faces the inner side of the exterior wall. However, the guiding plate may rather have a more ring-like structure which is for example either directly abuttable by a distal end of an inserted pipette tip, or which is connected to a respective end stop.

A guiding plate may have a shape selected from a ring-shape, a funnel-shape, a plate or disc-like shape, and a shim-like shape. In a plate-like or disc-like shape, the guiding plate preferably comprises a connection channel for providing a fluid passage from an inserted pipette tip into the gap.

A guiding plate may be desired when for example larger amounts of liquids shall be used, for example in the treatment of larger AOI's, and when the size or lateral extension of the dispense aperture is adapted accordingly. Longer distances of a fluid to move from an inserted pipette tip through the gap and into the fluid uptake area typically reduce the flow velocity. This may in turn reduce the effectiveness of the fluid treatment of the sample. By use of a guiding plate, the gap height may be controlled to allow a continuous fluid flow from the pipette tip through the gap into the fluid uptake area of a desired and sufficiently high flow velocity. The use of a guiding plate may also provide a higher stability for a pipette tip extension which is for example adapted to the treatment of a larger AOI.

The guiding plate defines the end stop for example in the case that the guiding plate itself is the end stop. The guiding plate may be arranged below the distance element, in particular below the sleeve, to be abuttable by the distal end of a pipette tip when the pipette tip is inserted into the pipette tip extension. The guiding plate here comprises advantageously a continuous opening which provides a fluid connection from the pipette tip through the guiding plate into the gap.

The guiding plate is connected to the end stop for example in the case where the end stop is a separate structure. Also in this case, the guiding plate comprises advantageously a continuous opening which provides a fluid connection from the pipette tip through the guiding plate into the gap. The end stop may for example be connected to the guiding plate in a way in which a fluid connection from the pipette tip through the guiding plate into the gap is ensured.

In an embodiment of the invention, which may be combined with any other of the embodiments which were or will be mentioned, unless there is a contradiction, the guiding plate extends perpendicular to the medial axis of the pipette tip extension and is connected to the inner side of the exterior wall by one or more support bars, the support bars providing one or more passages for fluidly connecting the gap (17) with the fluid uptake area.

The guiding plate may not necessarily have a perpendicular extension but may be arranged at a different angle, or the guiding plate may have for example a shape which deviates from a plate-like shape, for example a funnel-like shape or others. By the configuration of the shape and dimension of the guiding plate, the flow velocity of a liquid which is used with the pipette tip extension in the treatment of a sample may be influenced.

A support bar may for example be connected to the inner side of the exterior wall and extend laterally with respect to the medial axis of the pipette tip extension. A support bar may alternatively be a protrusion of the exterior wall which extends towards the medial axis of the pipette tip extension. Support bars which connect a guiding plate to the inner side of the exterior wall allow a continuous fluid passage from the gap into the fluid uptake area. The bars may have a more lath-like configuration with a lateral extension, as long as a fluid connection is allowed.

The use of bars to connect the end stop and/or a guiding plate with the exterior wall rather allows the connection being fluid permeable, so that a continuous fluid flow is allowed from an inserted pipette tip through the gap into the fluid uptake area. The use of two or more, or a multitude of bars for example therefore may establish the sieve-like structure of the constriction element.

The one or more support bars may be arranged at the distal end region of the pipette tip extension, but with an offset to the distal end. The one or more support bars may in this case be arranged on the same level as guiding plate. It may alternatively be possible that the one or more support bars are arranged flush with the distal end of the pipette tip extension, and extend inwardly to the guiding plate, which is arranged with an offset of the distal end of the pipette tip extension. The support bars may be arranged in a regular pattern, for example a star-like pattern within the inner cavity of the pipette ip extension, or may for a sieve-like structure of an irregular pattern. The configuration of the one or more support bars may depend on the desired design of the gap at the distal end of the pipette tip extension, or for example on the design of the guiding plate. The support bars may merge with a guiding plate, of they may be configured to carry a guiding plate.

In an embodiment of the invention, which may be combined with any other of the embodiments which were or will be mentioned, unless there is a contradiction, the guiding plate comprises a connection channel which provides a fluid connection between an inserted pipette tip and the gap.

The connection channel is a continuous through opening within the guiding plate which provides a fluid connection from the pipette tip through the guiding plate into the gap. A liquid which is dispensed from an inserted pipette tip may pass the guiding plate and enter the gap by the connection channel. The connection channel may also provide a sieve-like function in that it allows a fluid passage from an inserted pipette tip into the gap.

The connection channel may be arranged on the medial axis of the pipette tip extension, so that the medial axis extends through the connection channel. In this configuration, the pipette tip extension is configured in an axial symmetry, which may be an advantage for the manufacturing process, e.g. in injection molding. However, the connection channel may alternatively be arranged offset of the medial axis of the pipette tip extension, for example in cases where the distance element is configured to position a pipette tip offset of the medial axis, to allow a continuous fluid flow from an inserted pipette tip into the gap. In a further alternative, connection channel and the distance element are configured in a manner in which the distal end of an inserted pipette tip is positioned aside the connection channel. In this case, an additional fluid connector may be used for bridging the offset and for providing the continuous fluid flow from an inserted pipette tip through the guiding plate into the gap.

In an embodiment of the invention, which may be combined with any other of the embodiments which were or will be mentioned, unless there is a contradiction, the end stop is configured as an elongated, tubular hollow cylinder which is functionally connected to the connection channel.

The end stop may be formed by at least one of the following:
- a hollow cylinder which is functionally connected to the connection channel and to the distal end of the sleeve, the guiding plate,
- one or more support pars which extend from the exterior wall forming a ring-shaped stop which is connected to the connection channel of a guiding plate,
- a part of a complementary form-fit connection between a pipette tip extension inserted into the sleeve and the end stop, for example a rib or groove of a rip-groove-connection.

The hollow cylinder may serve not only as a stop element but in addition as a fluid connector between the distal end of an inserted pipette tip and the connection channel in the guiding plate. The length of the cylinder may therefore be adapted to the distance between the distal end of an inserted pipette tip and a guiding plate and/or one or more of support bars (which may correspond to the distance between the distal end of the sleeve). The cylinder may therefore be configured as an elongated cylinder, or more flatly as a washer-like (or shim-like) structure.

In a case where the guiding plate forms the end stop, it may be desired that in particular the region around the connection channel serves as a stop. This may for example be achieved in that the diameter of the connection channel is slightly smaller than the diameter of the distal end of the sleeve and/or the diameter of an inserted pipette tip. In this way, the region around the connection channel forms a shoulder which is abutted by the distal end of a pipette tip when it is inserted into the pipette tip extension, so that the insertion depth is limited by the guiding plate.

In the case where the end stop if formed by one or more support pars which extend from the exterior wall forming a ring-shaped stop which is connected to the connection channel of a guiding plate, the ring-shaped stop is abutted by the distal end of a pipette tip upon insertion. The ring-shaped stop may also be considered as a guiding plate, however, as explained before.

In the case where the end stop is formed by a part of a complementary form-fit connection between a pipette tip extension inserted into the sleeve and the end stop, for example a rib or groove of a rip-groove-connection, it may be desired that the sleeve is directly connected to the connection channel in a guiding plate, for example.

In an embodiment of the invention, which may be combined with any other of the embodiments which were or will be mentioned, unless there is a contradiction, the guiding plate comprises a groove which faces the gap at the distal end of the pipette tip extension.

The groove has been shown to reduce the dead volume of liquid when a liquid is aspirated from the fluid uptake area through the gap into an inserted pipette tip. It is currently though that this effect may base on a capillary effect. Dead volume in the present context is understood as being a volume of liquid which remains within the gap for example at the guiding plate although the liquid should have been aspirated into an inserted pipette tip extension.

In an embodiment of the invention, which may be combined with any other of the embodiments which were or will be mentioned, unless there is a contradiction, the groove extends at least in the proximity of the connection channel.

It may be possible that the groove extends circumferentially around the connection channel. It may further be possible that the groove is positioned closer to the connection channel than to the exterior wall or to the outer rim of the guiding plate, which faces to the inner side of the exterior wall.

In an embodiment of the invention, which may be combined with any other of the embodiments which were or will be mentioned, unless there is a contradiction, the distance element is configured as a sleeve for receiving and circumferentially enclosing a distal end of a pipette tip, the sleeve being open at the distal end for allowing a liquid being dispensed from an inserted pipette tip into the gap, and wherein the end stop is configured as an elongated, tubular hollow cylinder which provides a passage for fluidly connecting an inserted pipette tip with the gap, wherein the sleeve and the end stop are fluidly connected to provide the fluid connection between the pipette tip and the gap.

In an embodiment of the invention, which may be combined with any other of the embodiments which were or will be mentioned, unless there is a contradiction, the constriction element comprises a guiding plate which comprises the end stop, the guiding plate being arranged close to the distal end of the pipette tip extension but offset from the distal end of the pipette tip extension towards the proximal end, and delimits together with the inner side of the exterior wall the gap within the inner cavity of the pipette tip extension, and wherein the pipette tip extension further comprises an inner wall arranged between the sleeve and the exterior wall, wherein the inner wall extends circumferentially around the sleeve and along a direction from the distal end to the proximal end of the pipette tip extension, thereby restricting the fluid uptake area towards within the inner cavity, the inner wall being connected to the exterior wall by the distance bars, and being connected to the guiding plate at the side which faces towards the inner cavity.

In this embodiment, the inner wall encloses the sleeve, and further defined the limitation of the fluid uptake area opposite to the inner side of the exterior wall. By adapting the distance between the inner side of the exterior wall and the inner wall, the size of the fluid uptake area may be controlled independently from the dimension and configuration of the pipette tip which shall be inserted into the pipette tip extension.

The inner wall may extend parallel to the medial axis, though other orientations may be possible, for example to influence the configuration of the fluid uptake area. The inner wall may be connected to the sleeve by connection elements.

In an embodiment of the invention, which may be combined with any other of the embodiments which were or will be mentioned, unless there is a contradiction, the shape and dimension of the dispense aperture is adapted to the size of a sample to be treated (area of interest).

The pipette tip extension of the present invention is particularly useful when an area of interest of a sample shall be treated which has a relatively large size.

In an embodiment of the invention, which may be combined with any other of the embodiments which were or will be mentioned, unless there is a contradiction, the dispense aperture may have a circular form or a circular cross section, respectively, viewed orthogonally to the medial axis of the pipette tip. The dispense aperture is configured to release and receive volumes of a fluid.

In an embodiment of the invention, which may be combined with any other of the embodiments which were or will be mentioned, unless there is a contradiction, the sample is selected from a group comprising:
  a tissue, preferably a tissue prepared for histological analysis,
  a tissue section, preferably provided on a surface, such as a surface of a microscope slide,
  a cell or a cell culture thereof, including a bacterial cell, a fungi cell, a plant cell, an animal cell, and/or a human cell,
  a dried sample provided on a flat carrier, and
  one or more component of a tissue, tissue section, cell and/or cell culture.

A tissue may for example be a tissue isolated from a sample organism, which has been treated for conserving the structure and components of the tissue for a later analysis such as a histopathological analysis, for example by a formalin fixation step, a fixation with glutaraldehyde, a cryo-conservation step, or an alcohol fixation step, or other fixation steps available. A tissue may also be a part of a tissue which shall be subjected to further analysis. The tissue or a part thereof may be provided in an embedding medium, such as paraffin or other. The tissue may further be provided on a carrier, for example on a microscope slide or other means required for example for the subsequent preparation of tissue sections. The tissue may be isolated from a microorganism, a plant, an animal or a human.

A tissue section is a section of a tissue of interest, for example comprising a specific cell type or cellular context. A tissue section is generated typically from an isolated tissue, for example of a patient probe comprising an organic tissue with or without cancer cells. Typical tissue sections are for example of a thickness of 5 µm up to 30 µm. Thinner or thicker sections are possible, wherein thicker sections may also be considered as a part of a tissue. Tissue sections are typically provided in an embedding medium such as paraffin, or a medium for cryosections, and before the preparation of the section, the tissue has preferably been conserved by a fixation step. However, the tissue may also be directly frozen without a fixation step.

A cell may be any prokaryotic or eukaryotic cell which shall be subjected to an analysis. These may be for example a bacterial cell, including an archaebacterial cell. Exemplarily, a bacterial cell may be an *Escherichia coli* cell or other cells involved in standard laboratory assays, or other bacterial cells for example involved in a disease. A cell may also be a fungal cell, for example a *Saccharomyces Cerevisiae* cell. The cell may also be a cell derived from another eukaryotic organism, for example of a plant, an animal or a human.

A cell culture of a sample cell is a culture of a cell or a cell population in or on a culture medium or nutrient solution outside of the organism. The cell culture medium is adapted to the requirements of the cell to be cultured and to the requirements of the assay. For example, a bacterial cell may be cultured a semi-solid or solid cell culture medium in form of a so-called agar plate. It is also known to culture cells in a liquid culture medium, which is typically used for animal or human cell culture. Cells of a cell culture may be primary cells (directly generated from an organism) or a cell line (immortalized cells).

A component of a tissue, tissue section, cell and/or cell culture may be a protein, a nucleic acid, a carbohydrate, components comprising fatty acids, vitamins, hormones, other components of a cell, and/or combinations thereof, for example.

A dried sample provided on a flat carrier may for example be an originally liquid sample, for example a blood sample or a urine sample, which has been placed onto a suitable carrier and dried there. A suitable carrier may for example be a membrane configured to allow the binding of the respective sample.

In an embodiment of the invention, which may be combined with any other of the embodiments which were or will be mentioned, unless there is a contradiction, the exterior wall is a circumferential wall which tapers towards the distal end of the pipette tip extension.

The exterior wall may define the form and the outer dimensions of the pipette tip extension, which may be for example an oblong hollow body, which tapers at least in parts conically, e.g. in the region of the distal end, or tapers completely. The pipette tip extension may further be of an axially symmetric form, although an axially asymmetric form is possible too. For example, the pipette tip extension may have a circular cross section, in a plane orthogonal to the medial axis of the pipette tip extension, or may have a deviating form such as an oval, a rectangular form, or other forms.

Exemplarily, a pipette tip extension of 30 mm length is suitable, when a 200 µl volume pipette tip of 60 mm length shall be used and a liquid volume of 100 µl shall be dispensed and/or aspirated, and a small AOI or a medium sized AOI shall be addressed. The exterior wall may taper over the total length, or may additionally comprise for example cylindrical sections, which are preferably located at the proximal end of the pipette tip extension.

By way of example, a pipette tip extension configured for treating a small AOI may address a surface of about 2 mm$^2$, with the dispense aperture of the pipette tip extension having for example a radius of about 0.79 mm. A small AOI may for example have a diameter of about 1 mm. A pipette tip extension being configured for treating a medium sized AOI may address for example a surface of about 10 mm$^2$, with the dispense aperture of the pipette tip extension having for example a radius of about 1.8 mm. A medium-sized AOI may for example have a diameter of about 4 mm.

However, in such cases where a larger AOI shall be addressed, the shape and dimension of the exterior wall may be chosen to provide the required stability and a respective larger dispense aperture. Exemplarily, a pipette tip extension of about 10 mm length (along the medial axis) may be suitable in such a case, and the dispense aperture having a radius for example of about 7.5 mm, and may address a surface of about 175 mm$^2$; a larger sized AOI may correspondingly have a diameter of about 15 mm. The exemplary pipette tip extension 1 adapted for the treatment of a larger AOI may for example be configured to aspirate or dispense a liquid volume of about 500 µl.

The size of the AOI may not necessarily be circular, but have a deviating shape, which is for example be determined by the structure of interest. The dispense aperture of the pipette tip extension may be adapted to cover also an AOI of a complex shape, wherein for example a circular cross section of the dispense aperture (in a plane orthogonal to the medial axis of the pipette tip extension) may be a suitable shape to address AOI of different shapes.

In an embodiment of the invention, which may be combined with any other of the embodiments which were or will be mentioned, unless there is a contradiction, the exterior wall has a shape which is adapted to an outer shape, i.e. the shape of the exterior wall, of a pipette tip to be inserted into the pipette tip extension. Adapted can inter alia mean that at least parts of the exterior wall of the pipette tip extension show a shape similar to the outer shape of a pipette tip but in a different dimension, preferably in a larger dimension. It may be possible that in particular the inner side of the exterior wall of the pipette tip extension is adapted in its shape to the outer shape of a pipette tip. Alternatively, the exterior wall has a shape which is adapted to the shape of a desired AOL.

In an embodiment of the invention, which may be combined with any other of the embodiments which were or will be mentioned, unless there is a contradiction, the reception aperture may have a circular cross section, viewed orthogonally to the medial axis of the pipette tip extension, which is particularly suitable for inserting a pipette tip, although it might be possible that the reception aperture has a deviating cross-sectional shape, as discussed above.

In an embodiment of the invention, which may be combined with any other of the embodiments which were or will be mentioned, unless there is a contradiction, the exterior wall comprises at the distal end a seal for sealing the gap at the dispense aperture when the pipette tip extension is placed with the distal end onto a surface, or for example, into a sample.

The seal may for example be provided merely by the choice of the material and form of exterior wall at the distal end of the pipette tip extension. The seal may alternatively or in addition be provided by a separate seal material at the distal end of the pipette tip extension.

In an embodiment of the invention, which may be combined with any other of the embodiments which were or will be mentioned, unless there is a contradiction, the seal is provided by a separate material at the distal end of the pipette tip extension, which is over-molded or which is provided as an attachable seal.

In an embodiment of the invention, which may be combined with any other of the embodiments which were or will be mentioned, unless there is a contradiction, the exterior wall (4) is configured as being impervious to fluids.

Suitable materials are for example a plastic polymer such as polypropylene, polyethylene, or a fluoroelastomer, or of glass or a metal such as aluminum or steel. A plastic has the advantage of being in addition relatively cheap concerning production costs, and being slightly deformable. This allows to attach the pipette tip extension for example in a friction fit manner to a pipette tip. It is also the preferred material for a disposable use. However, it is also possible to attach the pipette tip extension by means of form fit, e.g. by a tongue and groove connection. Another suitable material is polytetrafluoroethylene. These materials additionally provide that the exterior wall is configures as being chemically inert.

It may be provided that not only the exterior wall but in addition for example the distance element is made of the same material as the exterior wall, as well as the constriction element and the respective, associated structures.

In an embodiment of the invention, which may be combined with any other of the embodiments which were or will be mentioned, unless there is a contradiction, the pipette tip extension is configured as an integrally produced workpiece.

In an embodiment of the invention, which may be combined with any other of the embodiments which were or will be mentioned, unless there is a contradiction, the pipette tip extension is configured as being ejectable from a pipette tip by an ejection mechanism, for example of a handheld pipette or of a liquid handling workstation. The ejection mechanism may for example be a passive mechanism of for example a rake-like structure, or a passive mechanism. By use of a passive mechanism, typically a pipette tip or in this case a pipette tip extension may be removed by moving the corresponding pipetting channel and thereby moving the pipette tip extension against the tines of the rake, while the ejection mechanism is stationary. By use of an active mechanism, the ejection mechanism itself is moved in relation to the pipette tip extension, and thereby actively removes the pipette tip extension from the pipette tip. In these cases, the friction connection between a pipette and a disposable pipette tip in this case is advantageously greater than the frictional connection between the disposable pipette tip and the attached pipette tip extension.

The features of the above-mentioned embodiments of the pipette tip extension can be used in any combination, unless they contradict each other.

Another aspect of the invention concerns an assembly comprising a pipette tip for aspirating and/or dispensing a liquid, and a pipette tip extension attached to the pipette tip. The pipette tip extension comprises a proximal end, a distal end, and an exterior wall extending between the proximal end and the distal end. The exterior wall has an outer side and an inner side and forms at the proximal end a reception aperture for inserting the pipette tip, and forms at the distal end a dispense aperture. The pipette tip extension further comprises an inner cavity enclosed by the inner side of the exterior wall, and a distance element connected to the inner side of the exterior wall, for positioning the pipette tip within the inner cavity and for establishing a fluid uptake area adjacent to the inner side of the exterior wall. The fluid uptake area extends from the dispense aperture towards the reception aperture and is in fluid connection with the surrounding atmosphere at the reception aperture. The pipette tip extension further comprises a constriction element which is connected to the inner side of the exterior wall of the pipette tip extension for controlling an insertion depth of the pipette tip within the pipette tip extension. The constriction element defines a gap with a gap height between a distal end of the inserted pipette tip and the distal end of the pipette tip extension. The constriction element comprises an end stop for the pipette tip and is configured as a fluid-permeable sieve-like structure.

The pipette tip extension may comprise one or more features as described above in the context of the single pipette tip extension. These features and/or different embodiments can be used in any combination unless they contradict each other. The definitions given to the pipette tip extension above apply also to the pipette tip extension being part of the assembly.

It is of an advantage of the pipette tip extension according to the invention to transport the pipette tip extension by means of the pipette tip which is inserted into the pipette tip extension, when for example the pipette tip is functionally connected to a liquid handling workstation. Otherwise, the pipette tip extension may be transported for example in a distinctively adapted extension carrier, which then may in turn be transported automatically by means of a robotic gripper of a liquid handling workstation. Manual transport is also possible if required A further aspect of the present invention concerns a method of treating an isolated area of a sample with a liquid.

The method comprises the following steps:
  generating an isolated area of a sample by means of a first fluid reservoir, the first fluid reservoir enclosing a distal end of a second fluid reservoir, and the isolated area of the sample being sealed towards the remaining area of the sample,
  bringing the isolated area of the sample into fluid connection with the second fluid reservoir,
  dispensing a fluid from the second fluid reservoir into the first fluid reservoir, thereby generating a fluid flow on the sample at the isolated area in a first direction, and
  aspirating the fluid from the first fluid reservoir into the second fluid reservoir, thereby generating a fluid flow on the sample at the isolated area in a second direction.

The methods provide for the treatment of a sample at an isolated area of a sample, while allowing the repeated use of the same fluid. Thereby, a locally well-defined and restricted treatment with a restricted volume of fluid may be achieved. When for example aiming to collect specific parts of a sample in a liquid, the method enables such a locally specific treatment and the collection and an enrichment of such parts in a well-defined volume of fluid. The provision of two fluid reservoirs between which the fluid may be moved at least once backward and forward (which is to be understood in the present context as a bidirectional movement), while the fluid is guided over the isolated area of the sample, allows the repeated collection of sample parts in the same fluid volume, so that the enrichment may occur.

In the methods, it is possible to dispense the complete volume of fluid out the second fluid reservoir, to allow the complete volume of fluid contacting the isolated area of the sample. However, it is also possible that a part of the volume of fluid remains in the second fluid reservoir, in particular when a liquid is used as a fluid, for example to avoid that air from the pipette tip is drawn from the pipette tip onto the sample.

In an embodiment of the invention, which may be combined with any other of the embodiments which were or will be mentioned, unless there is a contradiction, the first fluid reservoir is provided by a fluid uptake area of a pipette tip extension in an embodiment as discussed herein, and the second fluid reservoir is provided by a pipette tip. The method comprises the specific steps of: Providing a pipette tip extension, comprising one or more features as described above in the context of the single pipette tip extension. These features and/or different embodiments can be used in any combination unless they contradict each other. The definitions given to the pipette tip extension above apply also to the pipette tip extension being part of the assembly.

Further provided is a pipette tip to which the pipette tip extension is adapted. For treating a sample, a liquid is aspirated into the pipette tip. The pipette tip is inserted into the pipette tip extension, when the pipette tip is filled with the liquid, although it is also possible to first insert the pipette tip into the pipette tip extension and then aspirate a liquid with the assembly. The pipette tip extension is then placed with a distal end of the pipette tip extension onto a sample, and an area of the sample is isolated from a remaining area with the distal end of the pipette tip extension. By adjusting for example, the pressure by which the pipette tip extension is positioned on the sample, or a corresponding surface on which the sample is positioned, and/or by the provision of a sealing material at the distal end of the pipette tip extension, a sealing effect may be generated.

The method further comprises the step of dispensing the liquid from the pipette tip, thereby generating a liquid flow from the pipette tip over the isolated area of the sample into a fluid uptake area of the pipette tip extension in the inner cavity of the pipette tip extension, the fluid uptake area being defined by the inner side of the exterior wall and the distance element of the pipette tip extension as described above, by the outer side of the inserted pipette tip, and by the flat surface below the dispense opening.

An optional method step is the aspiration of the liquid back into the pipette tip, thereby generating a liquid flow in the opposite direction over the isolated area of the sample.

The method may be carried out with a pipette tip extension in an embodiment discussed above, and a commonly available disposable pipette tip. Alternatively, the method may be carried out by using an assembly comprising a pipette tip extension and a pipette tip in a configuration or a combination of configurations as described above.

In an embodiment of the invention, which may be combined with any other of the embodiments which were or will be mentioned, unless there is a contradiction, the method comprises one or more of the following steps after the dispensing of the fluid from the second fluid reservoir into the first fluid reservoir:
  soaking the isolated area of the sample with the fluid for a certain time period, whereby during soaking, the fluid contacts the isolated area of the sample without the application of a fluid flow, and/or
  consecutively aspirating and dispensing the fluid between the second fluid reservoir and the first fluid reservoir, thereby exposing the isolated area of the sample to a repeated, bidirectional fluid flow, and/or subjecting the isolated area of the sample to a temperature treatment, in particular to a heating step and/or a cooling step, using a heating device and/or a cooling device in operative contact with the sample, thereby allowing the fluid to adapt to the temperature of the sample.

A soaking step may particularly suitable when aiming the sample being incubated over a certain time period with the fluid used. For example, a soaking step may be suitable when performing a cell lysis reaction on the sample using a cell lysis reagent.

Any soaking time may be suitable, depending on the assay and/or sample requirements. Exemplarily mentioned, if a procedural economy is of interest, a soaking time may not exceed 10 minutes. A soaking step may be applied after dispensing the complete volume of fluid out of the pipette tip or after dispensing only a part of the fluid volume.

A step of consecutively aspirating and dispensing the fluid between the second fluid reservoir and the first fluid reservoir leads to a repeated exposure of the isolated area of the sample to a bidirectional fluid flow. This allows an enhanced interaction of the fluid with the isolated area of the sample, and may thereby for example help increasing the yield of components from a sample being collected with the fluid, or increasing the yield of collected sample itself. The number of repeats may be chosen depending on the situation or an assay protocol, for example.

Subjecting the isolated area of the sample to a temperature treatment allows the fluid to adapt to the temperature of the sample. This may particularly be desired when for example the sample is a frozen and formalin fixed paraffin embedded tissue section, and a nucleic acid extraction shall be carried out on this sample. It may in this case be necessary to raise the temperature of the tissue to above the melting point of paraffin, which is about 56° C. for typical histopathology paraffin. A temperature treatment may also be necessary for carrying out a cell lysis reaction, for example by thermal lysis, or an enzymatic lysis. A cell lysis reaction may require temperatures of about 72° C., or about 80° C., and may in addition require a treatment at about 90° C. for example for inactivating an enzyme involved in an enzymatic cell lysis reaction.

A temperature treatment may be carried out in combination with an aspiration and/or a dispensation step, including an incubation time in which the liquid in the gap adapts to the temperature of the sample. A sample for example on a microscopic slide may be temperature treated by placing the slide onto a respective heating plate or cooling plate. The liquid which is moved over the tempered slide may be incubated to allow the adaptation of the temperature of the liquid to the temperature of the microscopic slide.

However, alternatively, or additionally, the fluid may be adjusted to the temperature.

In an embodiment of the invention, which may be combined with any other of the embodiments which were or will be mentioned, unless there is a contradiction, the method comprises one or more of the following steps after the aspirating of the fluid from the first fluid reservoir into the second fluid reservoir:

generating a second isolated area of a sample by means of the first fluid reservoir, the first fluid reservoir continuously enclosing the distal end of the second fluid reservoir, and the second fluid reservoir further comprising the fluid, the sample being the same sample or another sample, and treating the second isolated area of the sample as defined before, and/or exchanging the first fluid reservoir by a third fluid reservoir, the configuration of the third fluid reservoir differing from the configuration of the first fluid reservoir with respect to the size of the area which is isolated and sealed towards the remaining area of the sample, and/or with respect to the volume of fluid which may be dispensed from the second fluid reservoir into the first or third fluid reservoir, and applying a bidirectional fluid flow to the second isolated area of the sample as defined before, and/or discarding the first fluid reservoir from the second fluid reservoir, and/or dispensing the fluid from the second fluid reservoir into a fluid container for further processing.

When generating a second isolated area and treating this area at least once with a bidirectional fluid flow as described above, a further enrichment of sample or sample components may be achieved when using the same fluid. This may particularly be advantageous when for example the components to be collected or isolated, respectively, generally occur in a small amount, and the same type of sample is available.

It may additionally or alternatively be possible to treat a second isolated area with the same liquid but addressing an area of interest of a different size. This may be achieved by exchanging the first fluid reservoir with a third fluid reservoir, which differs in view of the size of the area which is isolated. The size may be reduced or enlarged, or a different shape may be applied. This step might allow to collect a sample or components of an entire larger area of interest or of an area of interest having a shape which is otherwise difficult to address.

The step of discarding the first fluid reservoir from the second fluid reservoir may be carried out at any time point when the second fluid reservoir is required or desired to be free of the first fluid reservoir at the distal end. The same applies for any third or further fluid reservoir which is attached to the second fluid reservoir.

The step of dispensing the fluid from the second fluid reservoir into a fluid container makes the fluid being available for any other following processing steps. Fluid container may be any type of container for fluids, for example container for liquids being part of a laboratory equipment, such as tubes, microplates, or other.

In an embodiment of the invention, which may be combined with any other of the embodiments which were or will be mentioned, unless there is a contradiction, the dispensing of the fluid and/or the aspirating of the fluid is carried out with the total volume of a fluid present in the second reservoir and/or with a partial volume of the fluid present in the second reservoir. As mentioned above moving only a partial volume of the fluid may be advantageous to avoid drawing in air.

In an embodiment of the invention, which may be combined with any other of the embodiments which were or will be mentioned, unless there is a contradiction, the sample is selected from a group comprising:

a tissue, preferably a tissue prepared for histological analysis, a tissue section, preferably provided on a surface, such as a surface of a microscope slide, a cell or a cell culture thereof, including a bacterial cell, a fungi cell, a plant cell, an animal cell, and/or a human cell, a dried sample provided on a flat carrier, and one or more component of a tissue, tissue section, cell and/or cell culture.

A tissue may for example be a tissue isolated from a sample organism, which has been treated for conserving the structure and components of the tissue for a later analysis such as a histopathological analysis, for example by a formalin fixation step, a fixation with glutaraldehyde, a cryo-conservation step, or an alcohol fixation step, or other fixation steps available. A tissue may also be a part of a tissue which shall be subjected to further analysis. The tissue or a part thereof may be provided in an embedding medium, such as paraffin or other. The tissue may further be provided on a carrier, for example on a microscope slide or other means required for example for the subsequent preparation of tissue sections. The tissue may be isolated from a microorganism, a plant, an animal or a human.

A tissue section is a section of a tissue of interest, for example comprising a specific cell type or cellular context. A tissue section is generated typically from an isolated tissue, for example of a patient probe comprising an organic tissue with or without cancer cells. Typical tissue sections are for example of a thickness of 5 µm up to 30 µm. Thinner or thicker sections are possible, wherein thicker sections may also be considered as a part of a tissue. Tissue sections are typically provided in an embedding medium such as paraffin, or a medium for cryosections, and before the preparation of the section, the tissue has preferably been conserved by a fixation step. However, the tissue may also be directly frozen without a fixation step.

A cell may be any prokaryotic or eukaryotic cell which shall be subjected to an analysis. These may be for example a bacterial cell, including an archaebacterial cell. Exemplarily, a bacterial cell may be an *Escherichia coli* cell or other cells involved in standard laboratory assays, or other bacterial cells for example involved in a disease. A cell may also be a fungal cell, for example a *Saccharomyces Cerevisiae* cell. The cell may also be a cell derived from another eukaryotic organism, for example of a plant, an animal or a human.

A cell culture of a sample cell is a culture of a cell or a cell population in or on a culture medium or nutrient solution outside of the organism. The cell culture medium is adapted to the requirements of the cell to be cultured and to the requirements of the assay. For example, a bacterial cell may be cultured a semi-solid or solid cell culture medium in form of a so-called agar plate. It is also known to culture cells in a liquid culture medium, which is typically used for animal or human cell culture. Cells of a cell culture may be primary cells (directly generated from an organism) or a cell line (immortalized cells).

A component of a tissue, tissue section, cell and/or cell culture may be a protein, a nucleic acid, a carbohydrate, components comprising fatty acids, vitamins, hormones, other components of a cell, and/or combinations thereof, for example.

A dried sample provided on a flat carrier may for example be an originally liquid sample, for example a blood sample or a urine sample, which has been placed onto a suitable carrier and dried there. A suitable carrier may for example be a membrane configured to allow the binding of the respective sample.

In an embodiment of the invention, which may be combined with any other of the embodiments which were or will be mentioned, unless there is a contradiction, the fluid is a liquid which is selected from a group comprising:
 a buffer or cell culture medium for cultivating and/or maintaining and/or storing one or more samples,
 a reagent for treating the sample, preferably for performing a cell lysis reaction, a staining reaction, a binding reaction, or for removing an embedding medium,
 a transport liquid for collecting particles for further analysis.

A cell culture medium is a medium suitable for a short-term or long-term culture of a cell or a cell population.

A buffer is a reagent comprising a pH stabilizing component, for example in a salt solution. Examples are a HEPES- (Hydroxyethylpiperazin-Ethansulfonic acid) buffer, a natriumdihydrogenatephosphate buffer, or a TRIS based (Tris (hydroxymethyl)-aminomethane) buffer.

A reagent for performing a cell lysis reaction is for example a buffer comprising proteinase K, a Quick Extract FFPE DNA extraction solution (from Illumina Quick Extract FFPE DNA extraction kit), or a direct reagent form an Ion AmpliSeq Direct FFPE DANN kit.

A reagent for a staining reaction may be any reagent for staining an organ, cell type, or components thereof. Established staining techniques are for example immunohistological staining using antibodies, reagents for intercalating into nucleic acids such as Ethidium bromide, or other staining reagents for detecting for example basophilic, acidophilic or neutrophilic structures.

A reagent for carrying out a binding reaction may for example comprise antibodies, and/or magnetic beads.

A reagent for removing an embedding medium, for example for removing a paraffin embedding, may be an organic solvent such as Xylene, mineral oil, or Cyclohexane.

In an embodiment of the invention, which may be combined with any other of the embodiments which were or will be mentioned, unless there is a contradiction, the sample is a tissue section provided on a microscope slide, and the fluid is a liquid for performing a cell lysis reaction and for collecting one or more components of the tissue section selected from a group comprising:
 a nucleic acid,
 a protein,
 component comprising a carbohydrate, a fatty acid, a vitamin, and/or a hormone, or other cellular compounds, and/or
 combinations thereof.

In an embodiment of the invention, which may be combined with any other of the embodiments which were or will be mentioned, unless there is a contradiction, the tissue section is a formalin fixed, paraffin embedded tissue section from a biopsy or from a resected tumor.

In an embodiment of the invention, which may be combined with any other of the embodiments which were or will be mentioned, unless there is a contradiction, one or more of the method steps are carried out manually using a pipettor or automatically using a liquid handling workstation.

Pipettors are hand-held pipettes for the manual use by a laboratory staff. A manual use may have the advantage that the method may be carried out with method steps which are individually chosen and adapted to the actual situation.

Performing the method automatically by use of a liquid handling workstation has the advantage that a high number of samples may be treated in an accurate way with consistent quality and specificity. Liquid handling workstations are typically under the control of one or more controller, which control for example a pipetting robot, the liquids used, steps of aspirating, dispensing, mixing or other pipetting steps, movements of pipettes, containers, etc.

In an embodiment of the invention, which may be combined with any other of the embodiments which were or will be mentioned, unless there is a contradiction, the first fluid reservoir is provided by a pipette tip extension as described above, the second fluid reservoir is provided by a pipette tip for dispensing and/or aspirating a liquid, wherein the pipette tip extension is attached to the pipette tip by inserting a distal end of the pipette tip into the distance element of the pipette tip extension through the reception aperture of the pipette tip extension, and wherein a fluid connection between pipette tip extension and the pipette tip is generated by means of at least the one distance element which spaces apart the pipette tip from the pipette tip extension and the constriction element which controls the insertion depth of the pipette tip within the pipette tip extension.

In an embodiment of the invention, which may be combined with any other of the embodiments which were or will be mentioned, unless there is a contradiction, the pipette tip is selected from a group comprising disposable pipette tips and fixed pipette tips.

The method as described above is particularly suitable to be carried out with one of the pipette tip extension described herein, in any embodiment mentioned herein, together with a pipette tip. The configuration of the pipette tip extension and the pipette tip may be mutually adapted to form an assembly described herein.

The invention further relates to the use of a pipette tip extension as described herein in the manufacture of a liquid comprising one or more components of a sample which has been treated by means of the pipette tip extension.

The features of the above-mentioned embodiments of the method can be used in any combination, unless they contradict each other.

BRIEF DESCRIPTION OF THE DRAWINGS

Embodiments of the current invention are described in more detail in the following with reference to the figures (Fig.). These are for illustrative purposes only and are not to be construed as limiting. It shows FIG. 1A a schematic perspective side view of a pipette tip extension in an exemplary embodiment, FIG. 1B a schematic top view into a pipette tip extension of FIG. 1A, FIG. 1C a schematic sectional drawing of the pipette tip extension of FIG. 1A based on intersection plane C-C, FIG. 1D a schematic sectional drawing of the pipette tip extension of FIG. 1A based on intersection plane D-D, FIG. 2A a schematic bottom view drawing onto the distal end of a pipette tip extension of FIG. 1A, FIG. 2B a schematic sectional drawing of an exemplary embodiment of the distal end of a pipette tip extension based on intersection plane A-A, FIG. 3A a schematic, perspective drawing onto the distal region of a pipette tip extension in a further embodiment, FIG. 3B a schematic, perspective drawing of a sectional view of the distal region of the pipette tip extension of FIG. 3A, FIG. 3C a schematic, sectional drawing of the pipette tip extension of FIG. 3A with an inserted pipette tip, FIG. 4A a schematic sectional drawing of the distal end of the pipette tip extension of FIG. 3A, FIG. 4B the schematic sectional drawing of FIG. 4A with inserted pipette tip, the pipette tip extension being positioned onto a flat surface, FIG. 5A a schematic perspective drawing of a view onto the distal region of a pipette tip extension in a further embodiment, FIG. 5B a schematic perspective drawing of a view onto the proximal region of the pipette tip extension of FIG. 5A, FIG. 6 a schematic perspective sectional drawing of the pipette tip extension of FIG. 5B based on intersection plane A-A, FIG. 7 a schematic sectional drawing of the pipette tip extension of FIG. 5B based on intersection plane B-B, FIG. 8 a schematic overview drawing of a pipette tip extension of FIG. 6A functionally integrated into a liquid handling workstation, FIG. 9 a schematic overview diagram of method steps for treating a sample carried out with a pipette tip extension FIG. 10 a schematic diagram of further specified method steps of treating a sample, and FIG. 11 a schematic diagram of further specified, additional and optional method steps.

DETAILED DESCRIPTION OF THE INVENTION

Figure 1A:
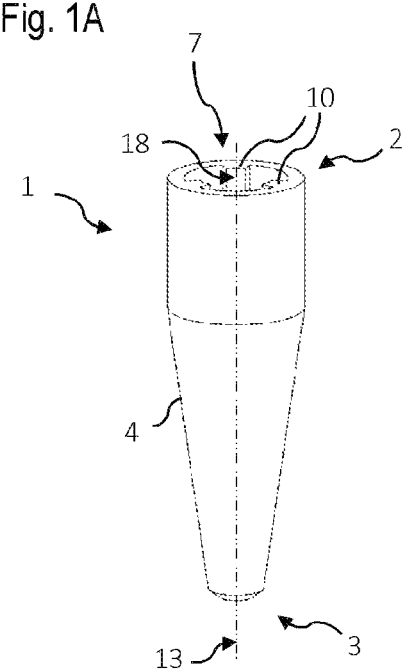

FIGS. 1A to 1D show an exemplary embodiment of a pipette tip extension 1 in a perspective drawing. The pipette tip extension 1 here is an elongated, tube-like body with a proximal end 2 and a distal end 3. An exterior wall 4 extends between the proximal end 2 and the distal end 3, and forms at the proximal end 2 a reception aperture 7 and forms at the distal end 3 a dispense aperture 8. The exterior wall 4, comprising an outer side 5 and an inner side 6, encloses an inner cavity 9. The inner cavity 9 is delimited by the inner side 6 of the exterior wall 4. The medial axis 13 is indicated, and corresponds here to the longitudinal axis of the pipette tip extension 1.

The pipette tip extension 1 shown here is a rotationally symmetric body. The reception aperture 7 is configured to receive a pipette tip 20 when the pipette tip extension 1 shall be attached to that pipette tip 20. The dimensions, in this case the diameter, of the reception aperture 7 is in particular bigger than the diameter of a pipette tip 20. The dispense aperture 8 is configured being abuttable to a flat surface in a sealing manner. The area of the flat surface, which is below the dispense aperture when a pipette tip extension 1 is sealingly abutted to that surface, and which is as a consequence also below the gap 17, may then be contacted by a liquid which is dispensed from a pipette tip 20 which is inserted into the pipette tip extension 1.

In the present context, the term "a pipette tip extension 1 attachable/attached to a pipette tip 20" describes essentially the same situation as the term "a pipette tip 20 insertable/inserted into a pipette tip extension 1".

The pipette tip extension 1 shown in FIG. 1A comprises a more proximal part which is formed as a cylindrical tube and a more distal part which tapers conically towards the distal end 3. This shape is an example of adapting the shape of the pipette tip extension 1 to the shape of a pipette tip 20 which shall be inserted. An additional measure for adapting the pipette tip extension 1 to the shape of a pipette tip 20 is for example the configuration of the distance elements 10 used. In the embodiment shown if FIG. 1A, three distance elements are used which are configured as elongated bars and which protrude into the inner cavity 9 towards the medial axis 13. Each of the elongated bars comprise a surface 18 which faces towards the medial axis 13, and which is configured as being abuttable at that surface 18 by an outer side of a pipette tip 20. A pipette tip may in this way being positioned within the inner cavity 9.

Figure 1B:
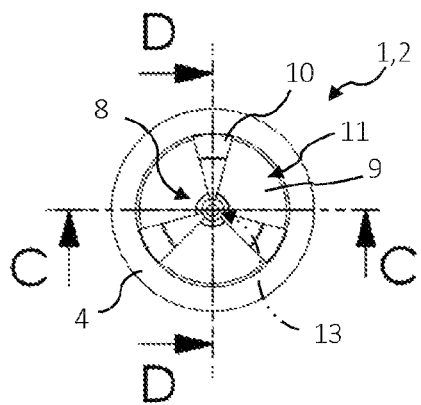
Figure 1C:
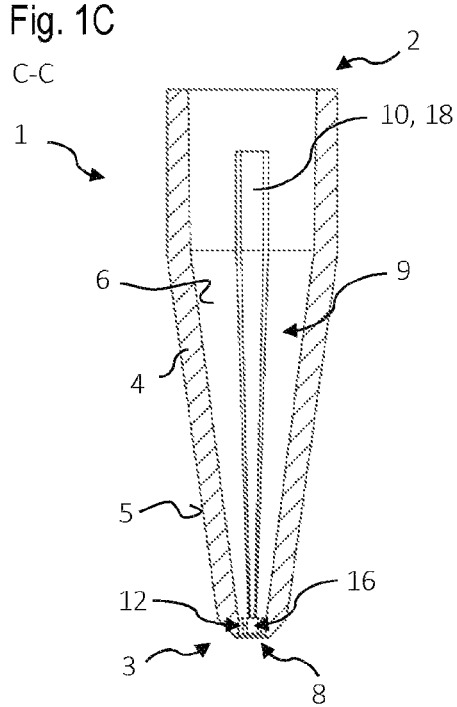
Figure 1D:
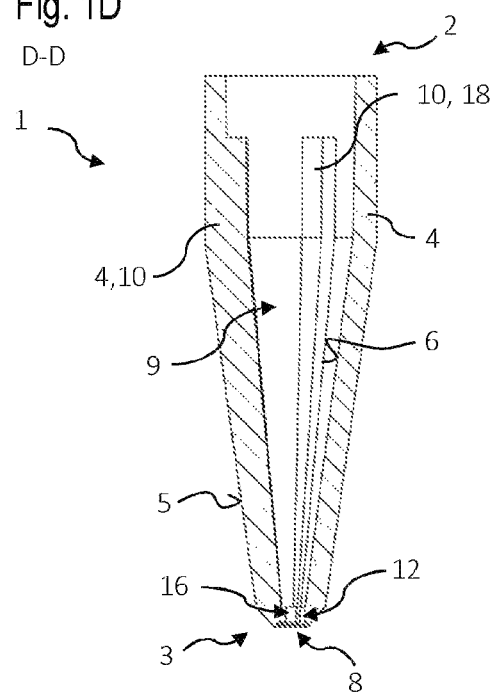

FIG. 1B shows a schematic top view of the proximal end 2 and into an embodiment of a pipette tip extension 1 which is identical with the embodiment of the pipette tip extension of FIG. 1A, except that the distance elements 10 are not arranged flush with the proximal end 2 but are arranged in an offset to the proximal end 2, as it is shown also in the FIGS. 1C and 1D. The surface of the upper edge of the pipette tip extension 1 is visible, and is formed in this embodiment by the proximal end of the exterior wall 4. The distance elements 10 are arranged on the inner side 6 of the exterior wall 4 and protrude into the inner cavity 9. The distance elements 10 thereby establish a fluid uptake area 11 which is adjacent to the inner side 6 of the exterior wall 4 and within the inner cavity 9. The dimensions of the distance elements 10 may in this embodiment have a direct influence onto the volume of the fluid uptake area 11.

In FIG. 1B, the course of the intersection planes C-C and D-D are indicated, on which the FIGS. 1C and 1D are based on.

In FIG. 1C, a schematic sectional view of the pipette tip extension 1 according to the intersection plane C-C is shown. The pipette tip extension 1 in an embodiment shown in FIG. 1B can be seen here in a longitudinal section, which particularly allows a view onto one of the distance elements 10 which is configured as an elongated distance bar. In contrast to the embodiment shown in FIG. 1A, the distance elements 10 are arranged with an offset to the proximal end 2, as indicated by respective lines in FIG. 1B. The inner bar extends over almost the entire length of the pipette tip extension 1. The surface 18 which is abuttable by a pipette tip 20 can be seen frontally. FIG. 1C also allows a view onto the distal end 3 of the pipette tip extension, in particular to the dispense aperture 8 and the constriction element 12. The constriction element 12 is arranged with an offset to the dispense aperture 8 and is comprises in this embodiment sieve-like support bars 15 which form together a ring-shaped constriction element, as can be seen in more detail in FIG. 2A. The distance bars for positioning a pipette tip 20 extends up to the constriction element 12. The constriction element 12, in particular the ring-like structure (compare e.g. FIG. 2A) may be directly abutted by a pipette tip 20 when the pipette tip 20 is inserted into the pipette tip extension 1. The ring-like structure here serves as an end stop 23 which restricts the insertion depth of a pipette tip 20, while the ring-like structure itself is fixed within the inner cavity 9 by the support bars 15. As the inner opening of the ring-like structure provides a fluid connection between the inner cavity of an inserted pipette tip 10 and the gap 17, and the interspaces between the support bars 15 provide a fluid connection between the gap 17 and the fluid uptake area 11 of the pipette tip extension 1, the constriction element 12 allows by the sieve-like structure a liquid being dispensed from an inserted pipette tip 20 and moved into the fluid uptake area 11 when the gap 17 is closed by a flat sample or a corresponding flat surface. The gap 17 may be seen in more detail in FIG. 2B, which shows the distal end 3 of the pipette tip extension 1 shown in FIG. 1C in a higher magnification.

In FIG. 1D, a schematic sectional view of the pipette tip extension 1 according to the intersection plane D-D is shown. This longitudinal section allows a frontal view of one of the distance bars being cut (left side) and one of the bars shown in a side view (right side). Visible here is also the connection channel 16, which is provided by the ring-shaped constriction element 12.

Figure 2A:
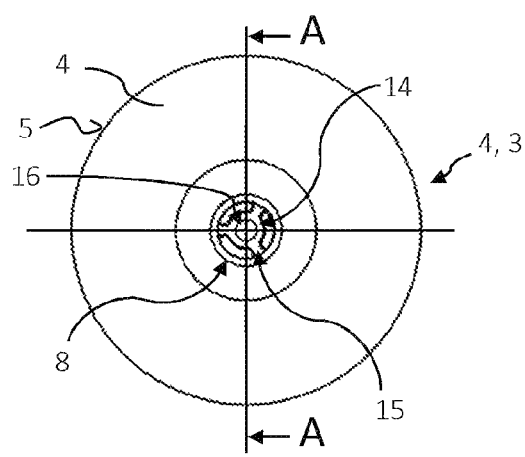

In FIG. 2A, a schematic bottom view drawing onto the distal end 3 of a pipette tip extension 1 is shown, the embodiment of the distal end 3 corresponds here to the embodiment of the distal end 3 of a pipette tip extension shown in FIG. 1A or FIG. 1C. In this view, the sieve-like structure of the constriction element 12 at the distal region of the pipette tip extension can be seen. The constriction element 21 comprises here three support bars 15 which are arranged star-like at the distal end 3 of the pipette tip extension 1 and which connect a ring-shaped structure, the guiding plate 14, to the exterior wall 4. The support bars 15 extend laterally with respect to the medial axis of the pipette tip extension 1, and form together with the ring-shaped guiding plate 14 the constriction element 12. The ring-like guiding plate 14 here functions as an end stop, as the guiding plate 14 is abuttable by the distal end of a pipette tip 20 and prevents that the pipette tip 20 is inserted further into the inner cavity 9 of the pipette tip extension 1 (compare to FIG. 2B). By the offset of the constriction element 12 to the sealing surface 19 at the distal end 3 of the pipette tip extension 1, as may be seen in FIG. 2B, a gap 17 of a gap height h is formed between the distal end 3 of the pipette tip extension 1 and the distal end of an inserted pipette tip 20 (compare again with FIG. 2B). The sieve-like configuration ensures that a liquid which is dispensed out of an inserted pipette tip 20 may flow into the gap 17, over a surface or a sample thereon, when the pipette tip extension 1 is sealingly positioned on such a surface, and into the fluid uptake area 11 within the inner cavity 9 of the pipette tip extension 1.

Figure 2B:
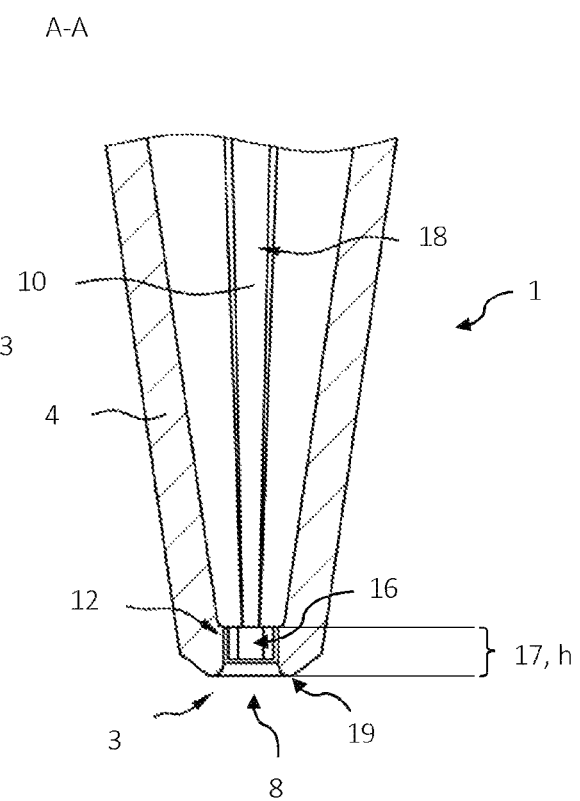

In FIG. 2A, the course of the intersection plane A-A is indicated, on which the FIG. 2B is based on.

In FIG. 2B, a schematic sectional drawing of an exemplary embodiment of the distal end of a pipette tip extension based on intersection plane A-A, indicated in FIG. 2A, is shown. In this longitudinal section, the formation of the gap 17 at the distal end of the pipette tip extension 1 and the gap height h can be seen in more detail. The constriction element 12 is abuttable by a distal end of a pipette tip 20, as discussed above. The gap 17 is formed at the distal end 3 of the pipette tip extension 1, when the pipette tip 20 comes to rest within the pipette tip extension 1 with an offset to the distal end 3 of said pipette tip extension 1. When a pipette tip extension 1 is placed for example onto a flat surface comprising a tissue section, the seal section 19 at the distal end 3 of the pipette tip extension 1 provides a seal, and the gap 17 is closed by the flat surface, or a flat sample, e.g. a tissue section placed thereon, respectively. In this situation, a fluid connection between an inserted pipette tip 20 and the fluid uptake area 11 in the inner cavity 9 of the pipette tip extension 1 is provided by the gap 17, while the sieve-like configuration of the constriction element 12 does not hinder a continuous fluid flow although it defines an end stop 23 for the pipette tip 20. As the fluid uptake area 11 is additionally in fluid connection with the surrounding atmosphere at the proximal end 2 of the pipette tip extension 1, it is ensured that a liquid may be moved between the interior of a pipette tip 20 and the fluid uptake area of the pipette tip extension when they are assembled to a functional unit. By means of the gap height h, a flow velocity of the fluid flow may be influenced.

Figure 3A:
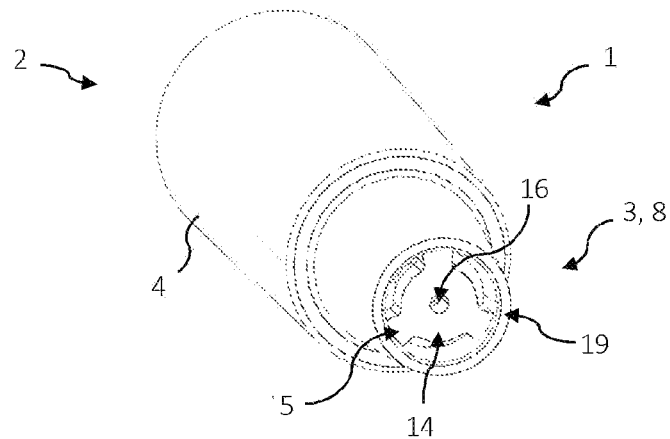

In FIG. 3A, a schematic, perspective drawing of a pipette tip extension 1 in another embodiment is shown as an overview, with a particular view onto the distal end 3 of the pipette tip extension 1 and the sieve-like structure of the constriction element 12. Also in this embodiment, the dispense aperture 8 can be seen with the constriction element 12 being arranged offset of the distal end 3, thereby forming a gap 17 at the distal end 3 of the pipette tip extension 1 (compare e.g. FIG. 4A). The offset of the constriction element 12 from the distal end 3 of the pipette tip extension 1, in particular the offset of the end stop 23 defined by the constriction element 12, directly influences the gap height h of the gap 17, as discussed before.

The constriction element 12 comprises a guiding plate 14, which has in this embodiment more a shim-like shape, and a central connection channel 16 which provides a fluid connection from an inserted pipette tip 20 into the gap 17. The constriction element 12 here also comprises support bars 15 which connect the guiding plate 14 to the inner side 6 of the exterior wall 4. The support bars 15 leave here by the interspaces between the support bars 15 three fluid passages at the inner side of the exterior wall 4, which allow a fluid being moved between the gap 17 and the fluid uptake area 11. The combination of shim-like guiding plate 14, the connection channel 16 and the support bars 15 provide the fluid-permeable sieve-like structure of the constriction element, which allows a fluid passage from an inserted pipette tip 20 through the connection channel 16 into the gap 17 and further from the gap 17 into the fluid uptake area 11 (compare also with FIG. 4B). The more shim-like shape of the guiding plate 14 allows the pipette tip extension 1 being configured for the treatment of medium-sized sample areas, as it provides more lateral stability, for example, compared to the embodiment of the pipette tip extension 1 shown in the FIGS. 1A to 2B, which are particularly useful in the treatment of small sample areas, as discussed above. The seal section 19 at the distal end 3 which provides a sealing connection to a flat surface, for example comprising a sample, is indicated.

Figure 3B:
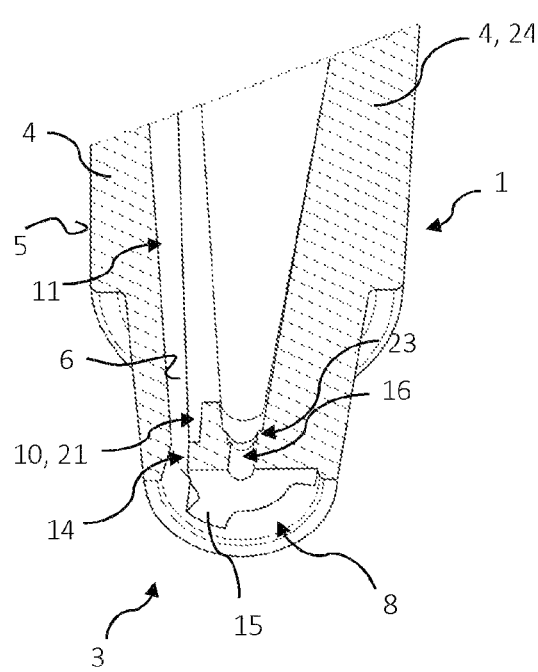

In FIG. 3B, a schematic, perspective drawing of a sectional view of the distal region of the pipette tip extension of FIG. 3A is shown. This longitudinal section allows a perspective side view onto the constriction element 12 and an additional view onto the distance element 10, which is configured here as a sleeve 21 and which joins the constriction element 12 towards the proximal end 2 of the pipette tip extension 1. The sleeve 21 is configured to enclose a distal end of a pipette tip 20 when it is inserted, as may be seen in FIG. 3C and in more detail in FIG. 4B, without hindering a fluid being moved of out or into the inner cavity of such an inserted pipette tip 20. The distal end of the sleeve 21 is directly followed (in this case adjoined) by a thickened guiding plate 14. The guiding plate 14 comprises a connection channel 16 which mouths into the distal end of the sleeve 21. The connection channel 16 has an upper (faced toward the proximal end 2) diameter which is slightly smaller than the diameter of the adjacent distal end of the sleeve, so that a shoulder is formed at the distal end of the sleeve 21. This shoulder is abutted by a distal end of a pipette tip 20 which is inserted into the pipette tip extension 1 and thus functions as an end stop 23 for controlling an insertion depth of a pipette tip 20. A pipette tip 20 which abuts the shoulder is thereby prevented to further move towards the distal end 3 of the pipette tip extension 1. The connection channel 16 here comprises inner bores of different diameters, which may help in guiding a fluid with a controlled flow velocity from an inserted pipette tip 20 into the gap 17. The sleeve 21, the connection channel 16 and the guiding plate 14 are integrally formed here, and commonly provide a positioning function (by the sleeve 21), a control of the insertion depth of a pipette tip 20 (by the end stop 23) while providing a fluid connection from an inserted pipette tip 20 into the gap 17. The support bars 15, which connect the guiding plate 14 to the inner side 6 of the exterior wall 4 are visible here, as well as the open passages which are left between the support bars 15 at the inner side 6 of the pipette tip extension 1.

Figure 3C:
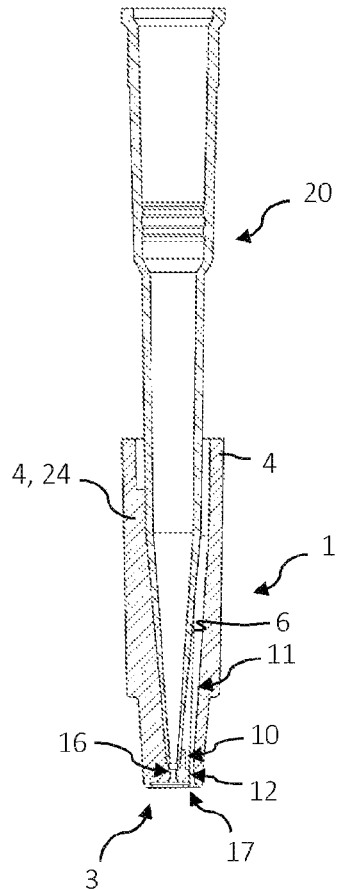

In the embodiment shown in FIG. 3B, the distance element 10 comprises in addition to the sleeve 21 distance bars 24 which are arranged at the inner side 6 of the exterior wall 4 and which protrude here with an offset from the proximal end 2 of the pipette tip extension 1 towards the distal end 3 (compare with FIG. 3C). The distance bars 24 may be configured analogously to the distance bars shown in FIGS. 1A to 2B. The distance bars 24 are configured here however to join the proximal end of the sleeve 21 (see for example the right side of the exterior wall 4, where a distance bar 24 is shown to be cut and to join the sleeve 21). The distance bars 24 here provide additional support in positioning a pipette tip 20 which is inserted into a pipette tip extension 1. These distance bars 24 are here particularly adapted to the outer shape of the inserted pipette tip 20 (see also FIG. 3C, left side of the longitudinal section), in that the extent, by which each distance bar 24 protrudes towards the medial axis 13 is adapted in such a way that each distance bar is abutted by the distal region of an inserted pipette tip 20. The distance bar 24 on the right side is shown being cut. The pipette tip extension 1 may comprise three distance bars 24 for example for supporting the positioning of an inserted pipette tip 20, though other numbers may be possible as well, as discussed above.

In FIG. 3C, a schematic overview drawing of a longitudinal section of the pipette tip extension 1 of FIG. 3A with an inserted pipette tip 20 is shown. In this drawing, a distance bar 24 on the left side is shown being cut. The arrangement of distance element 10 (the sleeve 21 in this case), constriction element 12 (guiding plate 14 and support bars 15) and connection channel 16 is shown in an overview, the details may be taken from FIG. 4B. In this longitudinal section, the fluid uptake area 11 at the inner side 6 of the pipette tip extension 1 is visible on the right side of the pipette tip extension, and the gap 17 at the distal end 3 is also visible, though FIG. 4B allows a more detailed view onto the gap 17 when a pipette tip 20 is inserted. The sleeve 21 is shown to hold the distal end of a pipette tip 20. The fluid passage which is allowed by the arrangement and configuration of the distance element 10 and the constriction element 12 can be seen in more detail in the FIG. 4A and in particular in the FIG. 4B, which are higher magnifications of the pipette tip extension 1 of FIGS. 3A-4C.

Figure 4A:
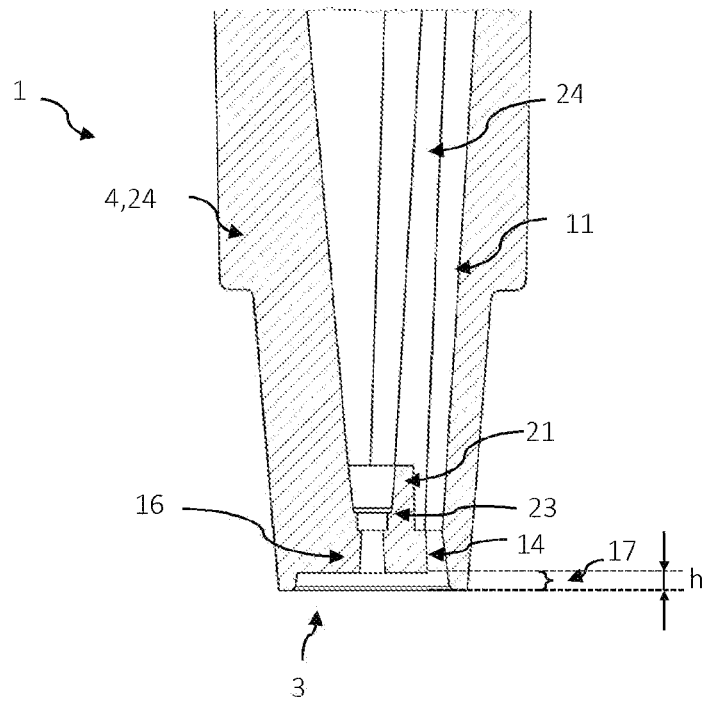
Figure 4B:
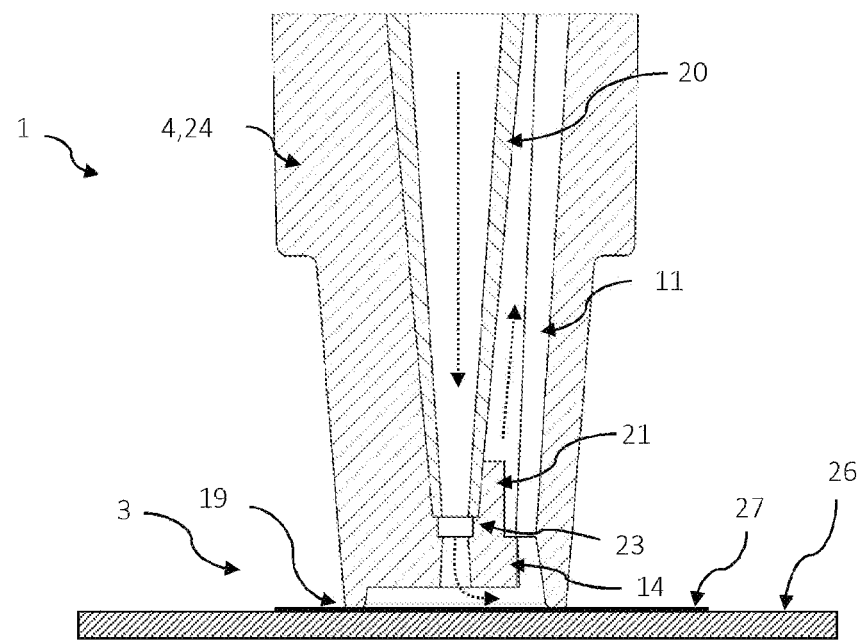

In FIG. 4A, the distal end 3 of an embodiment of a pipette tip extension 1 shown in FIGS. 3A-3C is presented in more detail in a schematic sectional drawing. In FIG. 4B, the same situation is shown but with a pipette tip 20 being positioned by the sleeve 21 and the distance bars 24, which also establish the fluid uptake area 11. The insertion depth of the pipette tip 20 is controlled by the end stop 23 of the constriction element.

In FIG. 4A, the gap 17 and the corresponding gap height h are shown in more detail. The gap 17 is restricted by the distal, lower surface of the guiding plate 14. As the guiding plate 14 is positioned with an offset from the distal end 3 of the pipette tip extension 1, the gap 17 is formed there. The gap 17 provides a fluid connection of the interior of the disposable pipette tip 20 and the fluid uptake area 11 in the inner cavity 9 of the pipette tip extension 1, wherein a connection channel 16 provides the fluid passage from an inserted pipette tip 20 (see FIG. 4B) to the gap 17, and further wherein the interspace between the outer edge of the guiding plate 14 and the inner side of the exterior wall 4 provides a fluid passage between the gap 17 and the fluid uptake area 11. The use and configuration of the support bars 15 ensure that the fluid connection is not interrupted by the guiding plate 14, and they contribute in the provision of the sieve-like openings, as well as the connection channel 16 arranged in the guiding plate 14. As the fluid uptake area 11 is additionally in fluid connection with the surrounding atmosphere at the proximal end 2 of the pipette tip extension 1, it is ensured that a liquid may be moved between the interior 18 of the pipette tip 20 and the fluid uptake area 11 of the pipette tip extension 1 when they are assembled. The distance bar 24 on the left side is shown to be cut.

In FIG. 4B, the same situation of FIG. 4A is shown but with an inserted pipette tip 20. The distal end of the inserted pipette tip 20 abuts the end stop 23. Furthermore, the functional assembly of pipette tip 20 and pipette tip extension 1 is placed onto a sample 27 on a microscopic slide 26. Exemplarily, the sample is a tissue section on the flat surface of a microscopic slide 26. The pipette tip extension 1 is sealingly attached onto the tissue section, and thereby restricts an area of interest which may be treated by liquid movements between the inserted pipette tip 20 and the pipette tip extension 1. The flow direction of a liquid which is dispensed here is indicated by dotted arrows. The fluid flow is enabled by the configuration and mutual arrangement of the distance element 10, configured here as a sleeve 21, the connection channel 16, the guiding plate 14 and the support bars 15. In particular the connection channel 16 in the guiding plate 14 and the support bars 15 contribute to the fluid-permeable, sieve-like structure of the constriction element In FIG. 5A, a schematic perspective drawing of a view onto the distal end 3 of a pipette tip extension 1 in a further embodiment is shown. In this embodiment, the pipette tip extension 1 is adapted for treating a larger area of interest. For this, the dispense aperture 7 at the distal end 3 has a larger diameter compared to those of previously discussed embodiments. The guiding plate 14 provides a larger area for being contacted by a liquid which is dispensed through the connection channel 16 into the gap 17, though the gap height h may be the same or of a comparable size than the gap heights h in other embodiments.

Also in this embodiment, the guiding plate 14 is connected to the inner side 6 of the exterior wall 4 by support bars 15 which are configured to provide interspaces between the guiding plate 14 and the inner side of the exterior wall 4. These interspaces serve as fluid passages, so that the fluid-permeability by the sieve-like structure is given, and a fluid may be moved from the gap 17 into the fluid uptake area 11 and back. The guiding plate 14 is here however configured as having an even larger surface area which faces towards the gap 17 and which may be contacted by a fluid during use of the pipette tip extension, as the guiding plate here as a more plate-like shape. As a measure to ensure that as much of a liquid is moved back from the gap 17 into an inserted pipette tip 20 for example during an aspiration step, a groove 22 is provided on the surface of the guiding plate 14 which faces the gap 17. Due to the surface tension the groove 22 holds the liquid during aspiration until the complete circumference of the groove ring is reached. In this way, early air aspiration is avoided and the residual liquid left on the sample minimized. It is believed that the groove "attracts" a liquid, which is present on the guiding plate 14 more closely to the exterior wall 4, towards the connection channel 16.

Figure 5A:
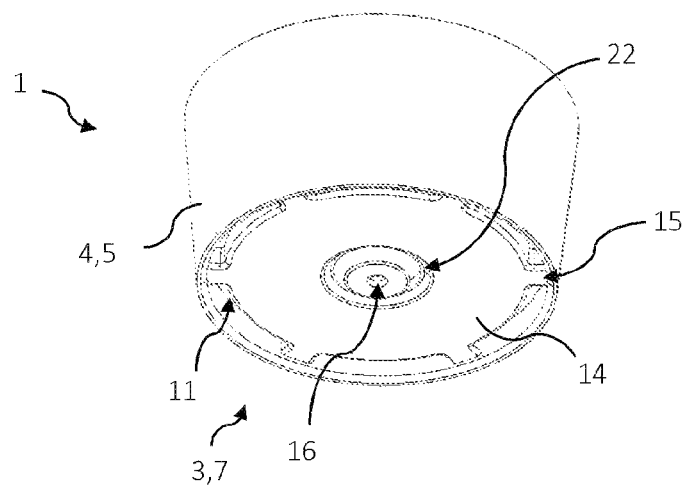
Figure 5B:
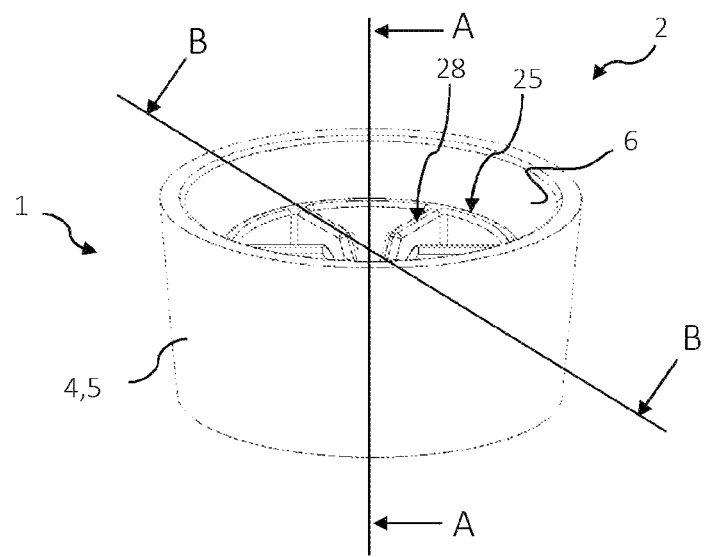

In FIG. 5B, a schematic perspective drawing of a view onto the proximal region of the pipette tip extension of FIG. 5A is shown. It can be seen here that in contrast to the previously discussed embodiments the inner cavity 9 comprises additional substructures. Here, an additional inner wall 25 is present. The inner wall 25 is connected by distance bars 24 to the inner side 6 of the exterior wall 4 and connected to a distance element 10 which configured as a sleeve 21 by connection elements 28 (see FIGS. 6A and 6B). Furthermore, the inner wall 25 is connected with its distal end to the guiding plate 14, so that additional structural stability is provided. By use of such an inner wall 25, the volume of the fluid uptake area 11 may be influenced, as the position of the inner wall 25, in particular the distance to the inner side 6 of the exterior wall 4, may have a direct influence onto the volume of the fluid uptake area 11.

Figure 6:
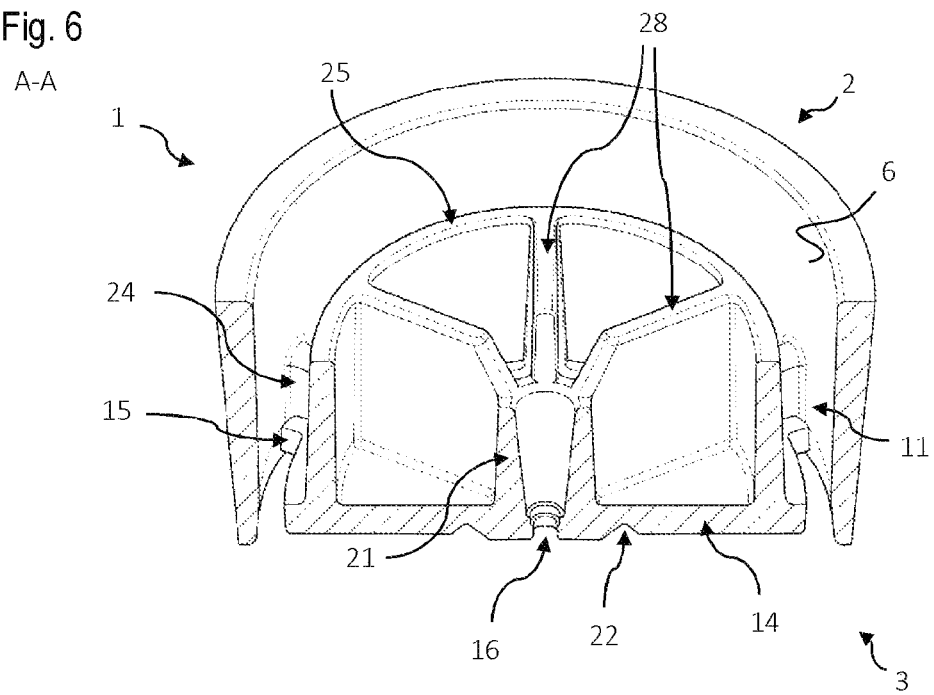
Figure 7:
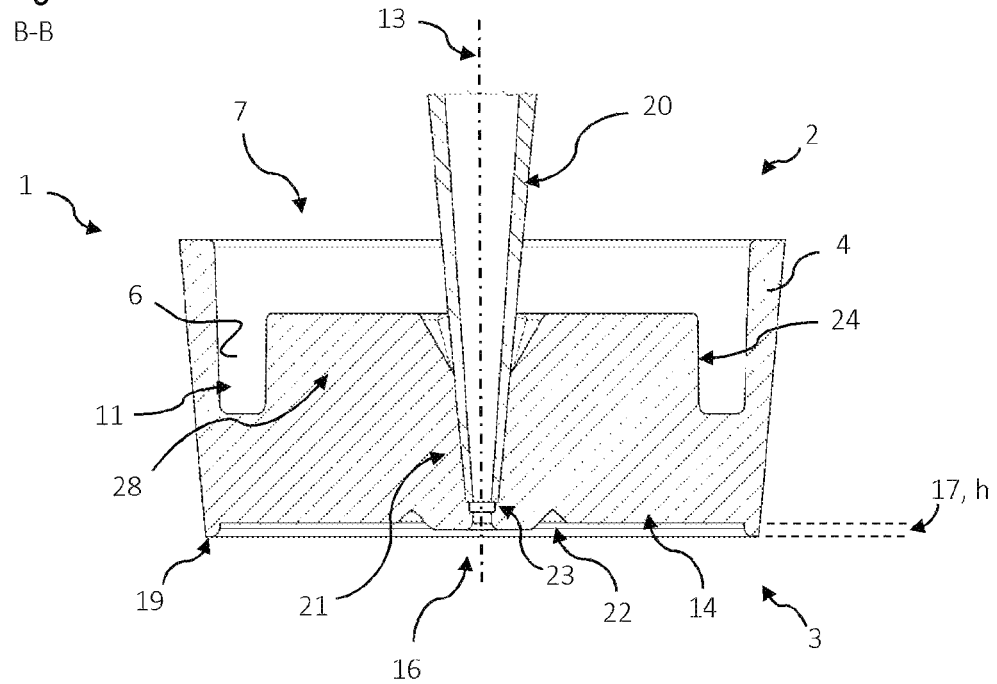

In FIG. 5B, the course of the intersection planes A-A and B-B are indicated, on which the FIGS. 6 and 7 are based on.

In FIG. 6, a schematic perspective sectional drawing of the pipette tip extension of FIG. 5B based on indicated intersection plane A-A is shown. The additional substructures for allowing the treatment of a larger area of interest while controlling the volume of the fluid uptake area 11 and thereby controlling the volume of required liquid for the treatment of a sample can be seen here in more detail. The sleeve 21 is arranged centrally, and the end stop 23, which is formed by a shoulder here at the immediate distal end of the hollow sleeve 21 and at the beginning of the connection channel 16, controls the insertion depth of a pipette tip 20 within the sleeve 21 and within the pipette tip extension 1 (compare FIG. 7). The sleeve 21, the end stop 23 and the guiding plate are integrally formed here, though they may also be formed separately, and being connected in alternative manners. A fluid from an inserted pipette tip 20 may be moved out of said pipette tip 20, into the connection channel 16 within the guiding plate 14, and further into the gap 17 below the lower surface of the large guiding plate 14.

The sleeve 21 is separated in this embodiment from the fluid uptake area 11 by an inner wall 25, which here extends circumferentially around the sleeve 21. The inner wall 25 further extends in a direction from the distal end 3 towards the proximal end 2. The inner wall 25 thereby restricts the fluid uptake area 11 towards the medial axis 13, and the dimension and position of the inner wall 25 may be used for example to further influence the volume of and the fluid flow within the fluid uptake area 11, as discussed before. The inner wall 25 here even prevents that the outer side of an inserted pipette tip 20 is contacted by the fluid which is used for the treatment of a sample.

The inner wall 25 is connected to the inner side 6 of the exterior wall 4 by distance bars 24. The distance bars 24 are here joined additionally with the support bars 15, though they may alternatively also be separate from each other, provided they do not restrict the fluid connection of the fluid uptake area 11 with the surrounding atmosphere at the proximal end 2 of the pipette tip extension 1. The inner wall 25 is further connected to the guiding plate 14, which provides additional stability here. In this perspective sectional view, the interspace which is formed between the support bars 15, the outer edge of the guiding plate 14 and the inner side 6 of the exterior wall 4 can be seen. As discussed also for the other embodiments of the pipette tip extension 1, these interspaces which are generated when for example support bars 15 are used, provide a fluid passage from the gap 17 into the fluid uptake area 11. Interspaces may alternatively be formed by more grid-like or even membrane like configurations of the constriction element, as long as they additionally provide the end stop function.

In FIG. 7, a schematic sectional drawing of the pipette tip extension of FIG. 5B based on intersection plane B-B is shown. In this longitudinal section, two of the connection elements 28 are cut. For a better overview, a pipette tip 20 is shown to be inserted into the sleeve 21. In this section it can be seen that the sleeve, the connection elements 28, the inner wall 25 as well as the end stop 23, the guiding plate 14, the support bars 15, the distance bars 14, and the exterior wall 4 are produced in one piece, for example by injection molding technology.

Although the diameter of the pipette tip extension 1 is in this case relatively large (it may be for example about 15 mm), a relatively small gap height h may nevertheless be generated (for example 0.4 mm). A smaller gap height h is particularly advantageously when only a small amount of liquid shall be used, for example for increasing the concentration of material gained in an extraction reaction, which is carried out on a tissue section. A smaller gap may also be of an advantage for improving the effect of a temperature treatment, when such a temperature treatment is directed primarily to the sample, and which requires that the fluid, which is present in the gap 17 and onto the tempered sample, is adapted to the temperature of the sample. In a smaller gap 17, the liquid may adapt relatively fast to the temperature of the sample. By means of the inner wall, the volume of liquid which is moved between an inserted pipette tip 20 and the pipette tip extension 1 may be further influenced, for example by providing a relatively small fluid uptake area 11.

Figure 8:
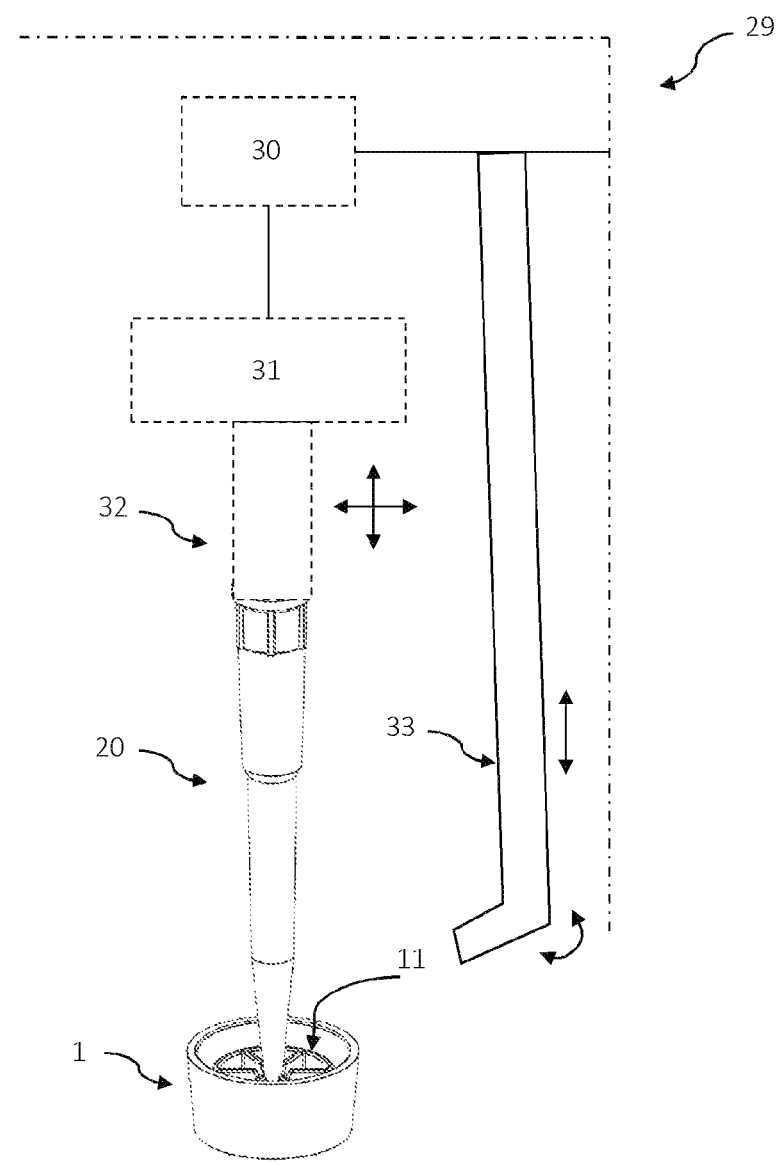

In FIG. 8, a pipette tip extension 1 in an embodiment of FIGS. 5A-7 is shown in a schematic overview during a liquid handling process of a liquid handling workstation 29. The liquid handling workstation is configured to handle liquids in an automated manner under the control of a controller 30. In particular, the controller controls the activity for example of a pipetting head 31 for aspirating and dispensing liquids and moving liquids. In FIG. 8, the pipette tip extension 1 is shown as being attached to a disposable pipette tip 20 which in turn is attached to a pipette 32 of a pipetting head 31. A liquid may be present in the fluid uptake area 11 of the pipette tip extension, though it is not shown here. Due to the configuration of the pipette tip extension 1, the liquid may be aspirated and or dispensed under the control of the liquid handling workstation 29, and the pipette tip extension 1 may for example be moved with the liquid aspirated into the pipette tip to a desired place of action by moving the pipette 32, to which the pipette tip extension 1 is connected via the pipette tip 20. The distance element 10 may in this case be configured to provide a friction fit or form-fit connection between the pipette tip extension 1 and the inserted pipette tip. The possible movements are indicated by arrows. The functional connection between the liquid handling workstation 29, the controller 30, and the pipetting head 31 are indicated by connection lines.

The liquid handling workstation 29 may additionally be configured to provide a mechanism of removing a pipette tip extension 1 from a pipette tip 20 to which it is attached. Such a mechanism may be for example an existing ejection mechanism 33 of the liquid handling workstation used for removing a disposable tip 20 from a pipetting head 31 or may be a separate mechanism.

Figure 9:
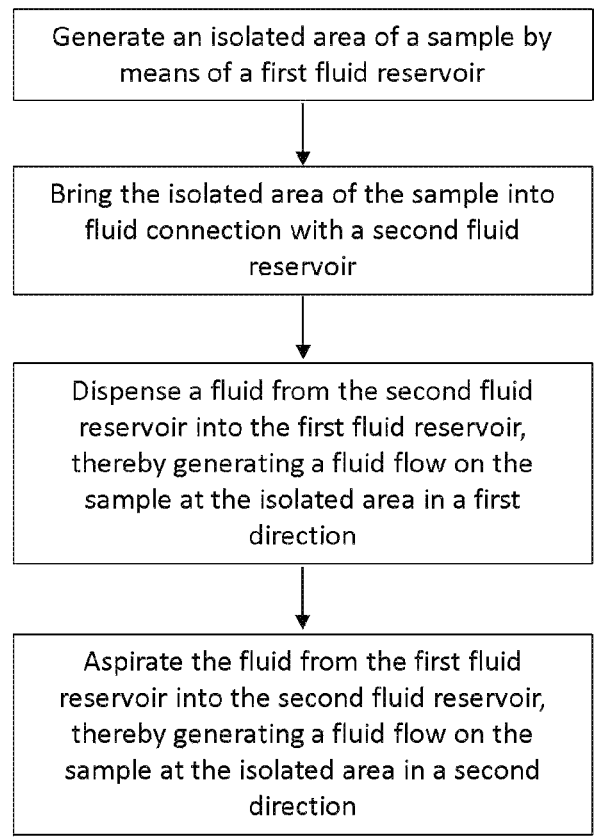

FIG. 9 shows in a schematic diagram a flow chart of an example of a method for treating a sample. The method may comprise the following steps:

Generating an isolated area of a sample by means of a first fluid reservoir. The first fluid reservoir encloses a distal end of a second fluid reservoir. The isolated area of the sample is sealed towards the remaining area of the sample by the first fluid reservoir, for example by the distal end of the first fluid reservoir, which may be for example a pipette tip extension 1 as discussed before.

Bringing the isolated area of the sample into fluid connection with a second fluid reservoir, which may be for example a pipette tip 20 filled with a fluid.

Dispensing a fluid from the second fluid reservoir into the first fluid reservoir, thereby generating a fluid flow on the sample at the isolated area in a first direction.

Aspirate the fluid from the first fluid reservoir into the second fluid reservoir, thereby generating a fluid flow on the sample at the isolated area in a second direction.

By the application of a bidirectional fluid flow, the influence of a fluid, for example of a liquid may be increased. This is for example an advantage when components of a sample or the sample itself shall be collected by a restricted volume of liquid. For example, when a nucleic acid of a tissue sample shall be extracted from said tissue sample, it is often a problem that the nucleic acid is available only in minor amounts, and typically, an enrichment step is required, for example a precipitation step, to have the nucleic acid available in a reasonable concentration. In particular by a repeated application of the bidirectional fluid flow, the amount of components collected by the liquid may significantly be increased without the need to increase for example the volume of liquid 20 to be used for the isolation of the components.

Figure 10:
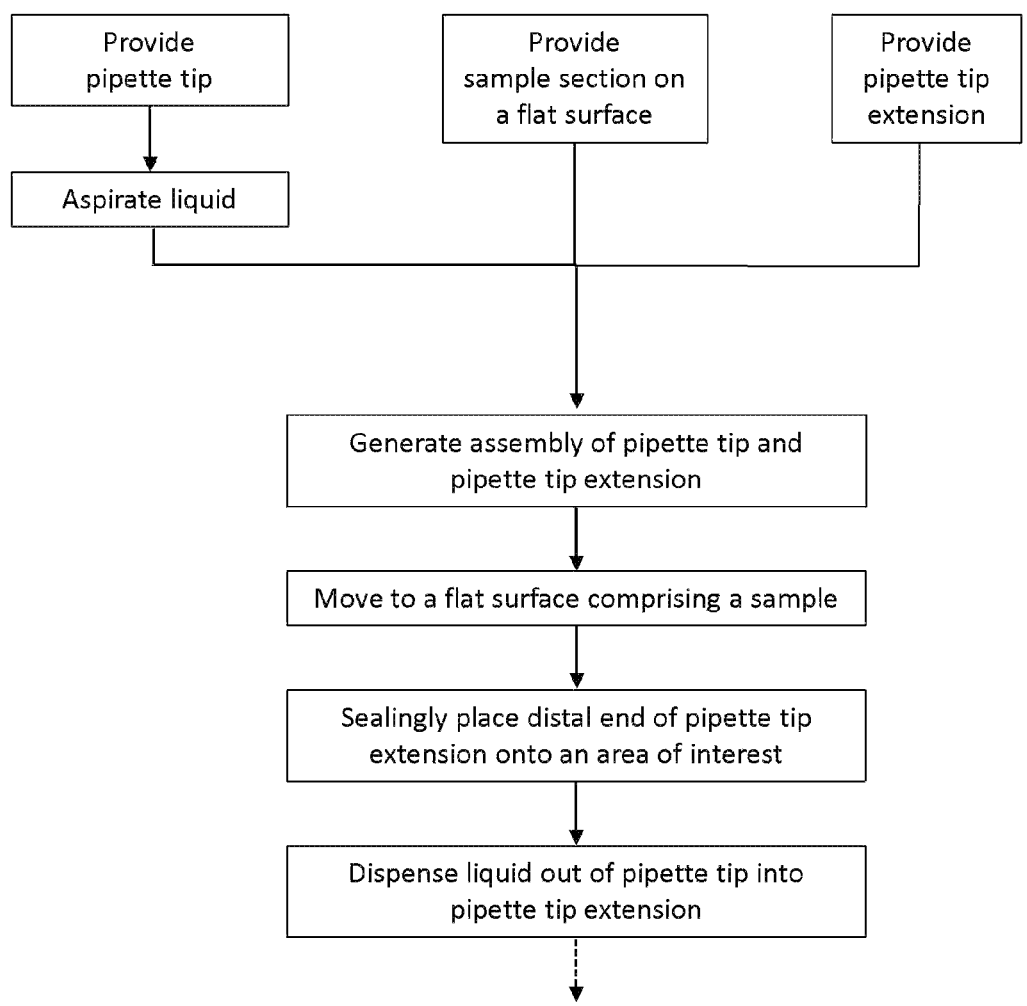

FIG. 10 shows in a schematic diagram a flowchart of further specified method steps for treating a sample. The method described herein is particularly directed for treating a sample section 27, which is for example immobilized on a surface, such as the flat surface of a microscopic slide 26. For allowing the generation of an isolated area of the sample by means of a first fluid reservoir, which is in fluid connection with the second reservoir, a pipette tip 20 may be provided additionally, as well as a pipette tip extension.

The pipette tip 20 and the pipette tip extension 1 are assembled to form a functional unit which is suitable for carrying out the method. The configuration of each of the elements of the assembly may be chosen according to the previous descriptions, and the different elements may be freely configured and combined to any combination as needed.

A liquid is aspirated by the pipette tip 20, preferably using an automated liquid handling workstation 29. The liquid may be aspirated before assembling the distinct elements; however, it is also possible to aspirate the liquid when the assembly has already been formed (not shown).

The assembly is moved to the sample, in the method described herein to a sample section 27 on a microscopic slide 26. The assembly is then placed onto the sample section 27 or the microscopic slide 26, respectively, at a desired area of interest. When the distal end 3 of the pipette tip extension 1 touches the surface, in this case, or has penetrated the sample by a certain depth, a sealing effect is established by the distal end of the pipette tip extension, and the area of interest or a part thereof is isolated from the surrounding sample. Furthermore, the now isolated area is in fluid connection with the pipette tip 20, specifically with the inner cavity of the pipette tip 20. By dispensing liquid from the pipette tip 20, the liquid is moved via the isolated area of the sample into the pipette tip extension 1. The isolated area of the sample is hereby exposed to the liquid, and the liquid is collected after the exposure in the pipette tip extension 1 for further steps.

Figure 11:
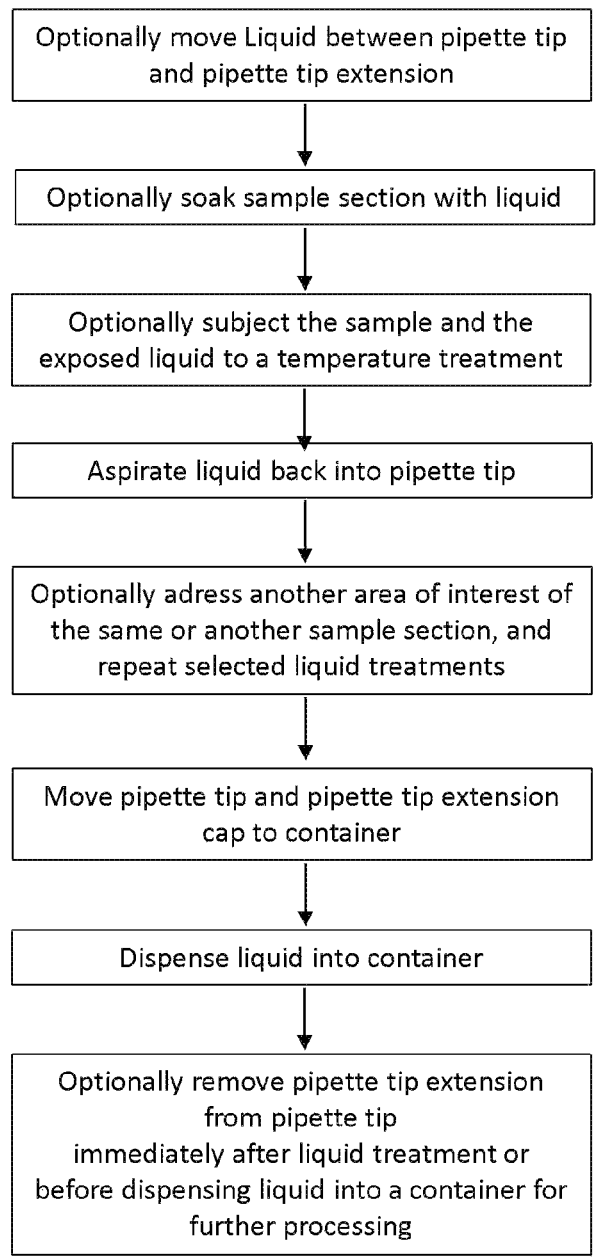

FIG. 11 shows in a schematic diagram a flowchart of further specified, additional and optional method steps. Optionally, for example, the liquid may repeatedly be moved between the pipette tip 20 and the pipette tip extension 1, by a so called mixing movement (a repeated aspiration and dispense step). The sample is hereby repeatedly exposed to the same liquid, which allows for example the enrichment of components of the sample within the liquid. Also optionally is a soaking step, which is the exposure of the liquid to the sample without the liquid being moved. A further optional step is the subjection of the sample to a temperature treatment. The sample is in this case tempered to the desired temperature, for example by heating or cooling, and a liquid in the pipette tip extension 1, to which the sample is exposed, is allowed to adapt to that temperature. After having the isolated sample area exposed by a desired time and/or fluid flow of the liquid and/or a temperature treatment, the liquid is then aspirated back into the pipette tip 20. Having the liquid back in the pipette tip 20, further processing steps may be carried out. For example, another sample area or another sample or area of interest, respectively, by be addressed with the same liquid, by sealingly place the distal end 3 of the pipette tip extension 1 onto the other area, and repeating one or more steps described above. By this, the liquid may be enriched by additional sample components.

However, the assembly comprising still the liquid may also be moved to a laboratory container, such as a vessel or tube, and the liquid being dispensed into that container. In an optional step, the pipette tip extension may be removed from the pipette tip immediately after the aspiration of the liquid into to the pipette tip after the treatment of the sample and before dispensing the liquid into the container, or the pipette tip extension 1 and pipette tip 20 remain assembled at least until the liquid is dispensed into the container.

Concerning the method as described by example by the FIGS. 9 to 11, the method steps may be carried out in another sequence where reasonable and desirable. Additional, optional steps may be possible. For carrying out the method steps, the pipette tip 20 is mounted on a pipette 32, for example on a manual pipettor or on a pipette of an automated liquid handling workstation 29 as mentioned before.

REFERENCE SIGNS LIST

1 pipette tip extension
2 proximal end
3 distal end
4 exterior wall
5 outer side of 4
6 inner side of 4
7 reception aperture
8 dispense aperture
9 inner cavity
10 distance element
11 fluid uptake area
12 constriction element
13 medial axis of 1
14 guiding plate
15 support bars
16 connection channel
17 gap
18 surface of 10
19 seal section
20 pipette tip s
21 sleeve
22 groove
23 end stop
24 distance bar
25 inner wall
26 microscopic slide
27 sample
28 connection element
29 liquid handling workstation
30 controller
31 pipetting head
32 pipette
33 ejection mechanism
h gap height

The invention claimed is:

1. A pipette tip extension attachable to a pipette tip, the pipette tip extension comprising:
  a proximal end, a distal end, and an exterior wall extending between the proximal end and the distal end, the exterior wall having an outer side and an inner side and forming at the proximal end a reception aperture for inserting the pipette tip, and at the distal end a dispense aperture,
  an inner cavity enclosed by the inner side of the exterior wall,
  a distance element connected to the inner side of the exterior wall, the distance element being configured to position the pipette tip within the inner cavity and to establish a fluid uptake area adjacent to the inner side of the exterior wall, the fluid uptake area extending from the dispense aperture towards the reception aperture and being in fluid connection with the surrounding atmosphere at the reception aperture, and
  a constriction element which is connected to the inner side of the exterior wall of the pipette tip extension, the constriction element being configured to control an insertion depth of a pipette tip within the pipette tip extension and thereby to define a gap with a gap height (h) between a distal end of an inserted pipette tip and the distal end of the pipette tip extension, the constriction element defining an end stop for a pipette tip and is configured as a fluid-permeable sieve-like structure.

2. The pipette tip extension according to claim 1, wherein the distance element is a sleeve which is configured to receive and circumferentially enclose a distal end of a pipette tip within the inner cavity.

3. The pipette tip extension according to claim 2, the sleeve is open at the distal end for allowing a liquid being dispensed from an inserted pipette tip into the gap.

4. The pipette tip extension according to claim 3, wherein the sleeve is connected to the inner side of the exterior wall by one or more distance bars which are arranged at the inner side of the pipette tip extension.

5. The pipette tip extension according to claim 4, comprising at least two additional distance elements, each distance element being configured as a distance bar which extends along a direction from the proximal end towards the distal end of the pipette tip extension, wherein the form of the distance bars and the position of the distance bars are configured such that each distance bar can be abutted by an outer side of a pipette tip when inserted into the pipette tip extension.

6. The pipette tip extension according to claim 4, wherein the sleeve is arranged centrally within the inner cavity, extending along a medial axis of the pipette tip extension.

7. The pipette tip extension according to claim 1, wherein the constriction element comprises a guiding plate which defines or is connected to the end stop, the guiding plate being arranged close to the distal end of the pipette tip extension but offset from the distal end of the pipette tip extension towards the proximal end, and delimits together with the inner side of the exterior wall the gap at the distal end of the pipette tip extension.

8. The pipette tip extension according to claim 7, wherein the guiding plate extends perpendicular to the medial axis of the pipette tip extension and is connected to the inner side of the exterior wall by one or more support bars, the support bars providing one or more passages for fluidly connecting the gap with the fluid uptake area.

9. The pipette tip extension according to claim 8, wherein the guiding plate comprises a connection channel which provides a fluid connection between an inserted pipette tip and the gap.

10. The pipette tip extension according to claim 9, wherein the end stop is configured as an elongated, tubular hollow cylinder which is functionally connected to the connection channel.

11. The pipette tip extension according to claim 7, wherein the guiding plate comprises a groove which faces the gap at the distal end of the pipette tip extension.

12. The pipette tip extension according to claim 1, wherein the distance element is configured as a sleeve for receiving and circumferentially enclosing a distal end of a pipette tip, the sleeve being open at the distal end for allowing a liquid being dispensed from an inserted pipette tip into the gap, and
wherein the end stop is configured as an elongated, tubular hollow cylinder which provides a passage for fluidly connecting an inserted pipette tip with the gap, wherein the sleeve and the end stop are fluidly connected to provide the fluid connection between the pipette tip and the gap.

13. The pipette tip extension according to claim 12, wherein the constriction element comprises a guiding plate which comprises the end stop, the guiding plate being arranged close to the distal end of the pipette tip extension but offset from the distal end of the pipette tip extension towards the proximal end, and delimits together with the inner side of the exterior wall the gap within the inner cavity of the pipette tip extension, and
wherein the pipette tip extension further comprises an inner wall arranged between the sleeve and the exterior wall, wherein the inner wall extends circumferentially around the sleeve and along a direction from the distal end to the proximal end of the pipette tip extension, thereby restricting the fluid uptake area towards within the inner cavity, the inner wall being connected to the exterior wall by the distance bars, and being connected to the guiding plate at the side which faces towards the inner cavity.

14. The pipette tip extension according to claim 1, wherein the exterior wall comprises at the distal end a seal for sealing the gap at the dispense aperture when the pipette tip extension is placed with the distal end onto a surface.

15. A method of treating a sample with a liquid, the method comprises the following steps:
providing a pipette tip extension according to claim 1,
aspirating a liquid into a pipette tip,
inserting the pipette tip filled with the liquid into the pipette tip extension
placing the pipette tip extension with the distal end onto a sample, isolating an area of the sample from a remaining area with the distal end of the pipette tip extension, and
dispensing the liquid from the pipette tip into the pipette tip extension, thereby generating a liquid flow from the pipette tip over the isolated area of the sample and into the fluid uptake area of the pipette tip extension.

16. The method of claim 15, comprising one or more of the following steps after the dispensing of the liquid from the pipette tip into the pipette tip extension:

soaking the isolated area of the sample with the liquid for a certain time period, whereby during soaking, the liquid contacts the isolated area of the sample without the application of a liquid flow, and/or
consecutively aspirating and dispensing the fluid between the pipette tip and the pipette tip extension, thereby exposing the isolated area of the sample to a repeated, bidirectional fluid flow, and/or
subjecting the isolated area of the sample to a temperature treatment, in particular to a heating step and/or a cooling step, using a heating device and/or a cooling device in operative contact with the sample, thereby allowing the fluid to adapt to the temperature of the sample.

17. The method of claim 15, wherein the dispensing of the fluid and/or the aspirating of the fluid is carried out with the total volume of a fluid present in the second reservoir and/or with a partial volume of the fluid present in the second reservoir.

18. The method of claim 15, wherein the sample is selected from a group comprising:
a tissue,
a tissue section,
a cell or a cell culture thereof, including a bacterial cell, a fungi cell, a plant cell, an animal cell, and/or a human cell,
a dried sample provided on a flat carrier, and
one or more component of a tissue, tissue section, cell and/or cell culture.

19. The method of claim 15, wherein the fluid is a liquid which is selected from a group comprising:
a buffer or cell culture medium for cultivating and/or maintaining and/or storing one or more samples,
a reagent for treating the sample,
a transport liquid for collecting particles for further analysis.

20. The method of claim 15, wherein the sample is a tissue section provided on a microscopic slide, and the fluid is a liquid for performing a cell lysis reaction and for collecting one or more components of the tissue section selected from a group comprising:
a nucleic acid,
a protein,
component comprising a carbohydrate, a fatty acid, a vitamin, and/or a hormone, or other cellular compounds, and/or
combinations thereof.

21. The method according to claim 15, wherein one or more of the method steps are carried out manually using a pipettor or automatically using a liquid handling workstation.

22. An assembly comprising
a pipette tip for aspirating and/or dispensing a liquid,
a pipette tip extension attached to the pipette tip, the pipette tip extension comprising
a proximal end, a distal end, and an exterior wall extending between the proximal end and the distal end, the exterior wall having an outer side and an inner side and forming at the proximal end a reception aperture for inserting the pipette tip, and at the distal end a dispense aperture,
an inner cavity enclosed by the inner side of the exterior wall,
a distance element connected to the inner side of the exterior wall, for positioning the pipette tip within the inner cavity and for establishing a fluid uptake area adjacent to the inner side of the exterior wall, the fluid uptake area extending from the dispense aperture towards the reception aperture and being in fluid connection with the surrounding atmosphere at the reception aperture, and a constriction element which is connected to the inner side of the exterior wall of the pipette tip extension for controlling an insertion depth of the pipette tip within the pipette tip extension, the constriction element defining a gap with a gap height (h) between a distal end of the inserted pipette tip and the distal end of the pipette tip extension, the constriction element comprises an end stop for the pipette tip and is configured as a fluid-permeable sieve-like structure.

* * * * *